United States Patent
Le Paih et al.

(10) Patent No.: US 12,011,007 B2
(45) Date of Patent: Jun. 18, 2024

(54) PRODUCTION OF THREE-DIMENSIONAL PRODUCTS FROM A MASS OF PUMPABLE FIBROUS FOODSTUFF MATERIAL

(71) Applicants: MAREL FURTHER PROCESSING B.V., Boxmeer (NL); MAREL FRANCE, Baud (FR)

(72) Inventors: Jacques Le Paih, Baud (FR); Thomas Willem Dekker, Boxmeer (NL); Yohann Pierre, Baud (FR); Johannes Martinus Meulendijks, Boxmeer (NL); Fabrice Le Pabic, Baud (FR)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 136 days.

(21) Appl. No.: 17/909,586

(22) PCT Filed: Mar. 10, 2021

(86) PCT No.: PCT/EP2021/056028
§ 371 (c)(1),
(2) Date: Sep. 6, 2022

(87) PCT Pub. No.: WO2021/180775
PCT Pub. Date: Sep. 16, 2021

(65) Prior Publication Data
US 2023/0115775 A1     Apr. 13, 2023

(30) Foreign Application Priority Data

Mar. 10, 2020   (EP) .................................. 20305247

(51) Int. Cl.
*A22C 7/00*          (2006.01)
(52) U.S. Cl.
CPC .................................. *A22C 7/0069* (2013.01)

(58) Field of Classification Search
CPC .... A22C 7/0069; A22C 7/0053; A22C 7/0084
(Continued)

(56) References Cited

U.S. PATENT DOCUMENTS 4,068,008 A * 1/1978 Orchard ................... A22C 7/00
                                                             426/272
4,293,979 A   10/1981 Colosimo et al.
(Continued)

FOREIGN PATENT DOCUMENTS

CN       1042044 A    5/1990
CN     101444323 A    6/2009
(Continued)

OTHER PUBLICATIONS

Extended European Search Report from corresponding European Patent Application No. 20305247.7, Sep. 9, 2020.
(Continued)

*Primary Examiner* — Richard T Price, Jr.
(74) *Attorney, Agent, or Firm* — Workman Nydegger

(57) ABSTRACT

The production of three-dimensional products from a mass of pumpable fibrous foodstuff material includes feeding the mass into a chamber via an inlet. A perforated plate is stationary arranged at an outlet side and has a multitude of perforations therein between an inlet face and an opposed outlet face. A flow channels assembly include multiple flow channels. Each flow channel receives therein strands of fibrous foodstuff material emerging at an outlet face from a subset of the multitude of perforations. The strands merge into a coherent bundle, in which the strands are arranged against one another in a generally parallel orientation. A production device is arranged at the discharge mouths of the flow channels assembly, which production device is configured and operated to produce three-dimensional products, (Continued)

each product out of a portion of a bundle that is discharged from one of the discharge mouths.

15 Claims, 22 Drawing Sheets

(58) Field of Classification Search
USPC .......................................................... 452/174
See application file for complete search history.

(56) References Cited

U.S. PATENT DOCUMENTS

| | | |
|---|---|---|
| 4,614,489 A | 9/1986 | Juravic |
| 4,995,804 A | 2/1991 | Hirabayashi |
| 7,931,461 B2 | 4/2011 | Van Der Eerden et al. |
| 11,406,125 B2 | 8/2022 | Dunnewind et al. |
| 2004/0155129 A1 | 8/2004 | Le Paih |
| 2009/0026295 A1 | 1/2009 | Mathiebe et al. |
| 2009/0134308 A1 | 5/2009 | van der Eerden et al. |
| 2010/0084497 A1 | 4/2010 | Le Paih |
| 2015/0208716 A1* | 7/2015 | Schmid .................. A23P 30/10 425/149 |
| 2016/0271819 A1 | 9/2016 | Zeidler et al. |
| 2019/0076850 A1 | 3/2019 | Looft |
| 2019/0116814 A1 | 4/2019 | Le Paih et al. |
| 2019/0281842 A1* | 9/2019 | Erné .................. A22C 7/0076 |
| 2019/0343165 A1 | 11/2019 | Dunnewind et al. |
| 2021/0100255 A1 | 4/2021 | Lagares Gamero |

FOREIGN PATENT DOCUMENTS

| | | |
|---|---|---|
| CN | 201377007 Y | 1/2010 |
| CN | 106036967 A | 10/2016 |
| CN | 107410412 A | 12/2017 |
| CN | 110087473 A | 8/2019 |
| EP | 1749444 A1 | 2/2007 |
| WO | 2004002229 A2 | 1/2004 |
| WO | 2008091634 A2 | 7/2008 |
| WO | 2012012581 A1 | 1/2012 |
| WO | 2014148897 A2 | 9/2014 |
| WO | 2015012690 A2 | 1/2015 |

OTHER PUBLICATIONS

International Search Report from corresponding PCT Application No. PCT/EP2021/056028, Jun. 15, 2021.
Chinese search report in corresponding Chinese Patent Application No. 2021800188292, Mar. 10, 2021.
Office Action in corresponding Chinese Patent Application No. 202180018829.2, Jan. 10, 2023.

* cited by examiner

PRODUCTION OF THREE-DIMENSIONAL PRODUCTS FROM A MASS OF PUMPABLE FIBROUS FOODSTUFF MATERIAL

BACKGROUND

The present invention relates to the field of the production of three-dimensional products from a mass of pumpable fibrous foodstuff material, for example from ground meat.

In WO2015012690, e.g. as shown in FIG. 3 thereof, an installation for the production of three-dimensional products from a mass of pumpable fibrous foodstuff material, for example from ground meat, is disclosed. This exemplary prior art installation comprises a mobile mould member, in this example embodied as a drum mould member, having multiple mould cavities, each having a filling opening for the introduction of foodstuff mass into the mould cavity. The drum mould member is movably supported by the frame to rotate about a longitudinal axis. A mould member drive causes the mould member to move along a path, in said example a circular path about the axis. At a fill position mass is filled into a row of mould cavities of the drum and at a product release position the row of moulded products is released from the respective mould cavities. The installation further comprises, in general terms, a pump and a mass feed member that is arranged at the fill position relative to the mobile mould member. The foodstuff material is supplied by the pump to the mass feed member and is then transferred into the mould cavities. In more detail, this exemplary prior art installation has a mass feed member with a main carrier body that is provided with an elongated mounting slot. Multiple units are each releasably secured in the mounting slot. Each unit comprises a housing that has an inlet for foodstuff mass and a discharge mouth at the other end of the housing, so that mass is transferred from the housing via said discharge mouth of the unit into a passing mould cavity. The installation further comprises a pump that is connected at its inlet to a hopper that is adapted to receive therein a batch of pumpable foodstuff mass, e.g. ground meat. The pump outputs the mass as a single flow to a distributor which has a chamber with an outlet side where multiple outlets are provided. The distributor splits the single flow into a number of subflows corresponding to the number of units. Each subflow passes from a corresponding outlet of the distributor through a hose to a respective unit.

EP1 749 444, discloses an installation wherein a pump supplies a single flow of pumpable foodstuff material, e.g. of ground meat, to the inlet of a chamber of a distributor. At the outlet side of the chamber there are multiple outlets, each connected to a respective hose. The installation has a product-shaping device with parallel discharge mouths therein, each connected to one of the hoses. Therefore, the single flow of mass supplied by the pump is split by the distributor into subflows, each subflow passing through a respective hose to the shaping device. The subflows are discharged out of the shaping device. At the discharge side of shaping device a severing assembly is arranged, that is operated to sever the subflow so as to produce individualized food products that are received on the belt of a belt conveyor that travels underneath the shaping device.

In EP 1 749 444 the issue of consistency of the food products that are produced is addressed. In particular, it is mentioned that inconsistencies become evident between products that stem from the different discharge mouths. In order to improve consistency, EP 1 749 444 proposes to arrange a static mushroom-shaped body in the center of the chamber of the distributor, that serves to stabilize and equalize the pressure of the mass flowing through the chamber towards the outlets of the distributor.

The installations described above are not entirely satisfactory, in particular in view of inconsistencies between food products stemming from different discharge mouths.

SUMMARY

It is therefore an object of the present invention to provide an improved method and related systems and installations, e.g. alleviating or reducing the problem of inconsistencies between food products.

In the inventive method the mass of pumpable fibrous foodstuff material is fed by a foodstuff mass feed and pressurization assembly, e.g. comprising a pump, into a chamber via an inlet thereof. A perforated plate is stationary arranged at an outlet side of the chamber, which perforated plate has a multitude of perforations therein between an inlet face of the perforated plate directed towards said chamber and an opposed outlet face of the perforated plate.

For example, as preferred, the perforated plate is similar to a final grinder plate as present in meat grinder devices.

For example, the perforations are drilled holes.

For example, the perforations each have a length greater than the diameter of the perforation.

For example, the perforations have a diameter between 2 and 6 millimeters.

In an embodiment, all perforations are identical, possibly all perforations being parallel to one another.

A flow channels assembly connects to the outlet side of the chamber. This flow channels assembly comprises multiple flow channels, each flow channel having a flow channel inlet opening, a flow channel discharge mouth, and a flow channel length. The flow channel inlet openings are stationary arranged adjoining the outlet face of the perforated plate, so that each flow channel receives therein strands of fibrous foodstuff material emerging at the outlet face of the perforated plate from a subset of the multitude of perforations in the perforated plate.

The strands that are introduced into one of the flow channels merge as they move along the length of the channel into a coherent bundle, in which the strands are arranged against one another in a generally parallel orientation. Mainly depending on the configuration of the perforations the strands in the bundle may be highly parallel, e.g. as the perforations are all parallel and, for example, perpendicular to the outlet face of the perforated plate. In another embodiment, some intertwining of adjacent strands in a generally parallel orientation is envisaged, e.g. when the perforated plate is embodied as described in US2010/0084497, e.g. as the perforations are arranged in parallel rows, the axes of perforations of a same row and/or of two successive rows having opposite orientations, such that the strands of fibrous foodstuff intertwine. The length may vary from one embodiment to another yet will have a non-zero value in order to obtain this effect. In general, optimal design of the flow channels may involve experimentation.

The bundle of strands is confined within the flow channel and passes through the flow channel to the discharge mouth where the bundle is discharged, whilst maintaining the generally parallel orientation of the strands in the bundle.

A production device is arranged at the discharge mouths of the flow channels assembly, which production device is configured and operated to produce three-dimensional products, each product out of a portion of a bundle that is discharged from one of the discharge mouths. As will be discussed herein, many different types of production devices are envisaged in conjunction with the invention.

In the inventive approach, subsets of multiple strands emerge at the outlet face of the perforated plate. Each subset is immediately received in a corresponding flow channel to form a bundle therein. So, downstream of the outlet face, the strands that become a coherent bundle are immediately separated from the other subset(s) of strands, avoiding undue, or any, disturbance of the orientation of the strands. In general, the flow channels are shaped to maintain the generally parallel orientation of the strands in the bundle, so that said orientation is still observed in the coherent bundle that is discharged from the discharge mouth.

Compared to the installation discussed above with reference to EP 1 749 444, it is observed that in said prior art design, the orientation of fibrous material will be inconsistent when comparing products stemming from one discharge mouth to products stemming from another discharge mouth. Also, the orientation is likely to be unstable over time during a production run.

The inventive method can be further complemented by the provision of a grinder set comprising one or more grinder members, which grinder set is arranged in the chamber, upstream of the perforated plate. Herein at least one of these one or more grinder members is a mobile grinder member that is driven by a grinder drive, so that the fibrous foodstuff mass is ground by the one or more mobile grinder members of the set as it passes through the chamber. This embodiment forms an improvement over the prior art installation of FIG. 3 of WO2015012690, e.g. as the fibre orientation of the bundles emerging from the discharge mouths is now more consistent than with the prior art use of multiple grinders, each related to one discharge mouth. This allows, for example, for the production of enhanced quality ground meat products, e.g. burgers or steaks, having a so-called vertical fibre orientation between the upper and lower main faces thereof. This inventive approach also brings along structural and cost advantages in view of the prior art, e.g. just one grinder set instead of several small dimension grinder sets.

As preferred, between the feed and pressurization assembly, e.g. a pump, on the one hand, and the production device on the other hand, the chamber and the grinder set therein form the only location where grinding of the foodstuff is carried out, noting that, as preferred, the mass supplied to the feed and pressurization assembly is already ground before being supplied to the inventive installation.

In embodiments, downstream of the respective inlet opening, preferably immediately downstream of the inlet opening, each flow channel comprises a converging section in which the cross-sectional area of the flow channel gradually reduces, thereby gradually compressing the strands into the coherent bundle as the bundle passes through the converging section. It is noted that one or more further converging sections can also be provided more downstream in the flow channel.

In embodiments, the flow channels are each devoid of an internal divider so that one coherent bundle is discharged from each one of the discharge mouths. In an alternative embodiment, yet not preferred, a knife-edge type internal divider is arranged in the flow channel, e.g. in proximity of the discharge mouth, so that the bundle is sliced longitudinally into multiple sections.

In embodiments, the flow channel inlet openings all have substantially the same cross-sectional surface, the discharge mouths all have substantially the same cross-section surface, e.g. each differing from the cross-sectional surface of the respective inlet opening, e.g. smaller, and the flow channels are configured to all provide substantially the same flow resistance to the bundle passing there through from the flow channel inlet opening to the discharge mouth. This arrangement further enhances consistency when comparing products stemming from one discharge mouth to products from another discharge mouth. In embodiments, all flow channels have the exact same configuration.

In embodiment, for each flow channel, the flow channel discharge mouth has a cross-sectional shape that differs in cross-sectional shape from the flow channel inlet opening. For example, the inlet opening has the shape of an annular sector, e.g. multiple inlet openings arranged on a common radius about a center of the perforated plate, and the discharge mouths are each of circular or oblong cross-sectional shape. Herein, the flow channel comprises a shaping section having a gradually changing cross-sectional shape, wherein the bundle is confined within the flow channel and is gradually shaped into said cross-sectional shape of the discharge mouth whilst maintaining the generally parallel orientation of the strands in the bundle until the discharge thereof. In another example, the inlet openings each have an elliptical shape, e.g. in an embodiment with four flow channels, and the discharge mouths each have a circular shape, e.g. with the discharge mouths being arranged in a common plane, e.g. to fill circular shaped cavities that are aligned in a row of a mould drum.

In embodiments, the flow channels assembly is made using an additive manufacturing technology, e.g. as one rigid and monolithic flow channels assembly body, e.g. 3D printed of plastic material. The body could also be composed of body parts, e.g. each being individually made by additive manufacturing technology and then interconnected.

In embodiments, the multitude of perforations in the perforated plate are distributed within a circular area or an annular area of the perforated plate. Herein, the inlet opening of each of the flow channels is configured with a cross-sectional surface that corresponds to a circular sector or an annular sector of the area in which the multitude of perforations are distributed. An annular sector is, for example, envisaged when the plate has a blind center—so lacking perforations in the center, e.g. in view of a grinder shaft being supported on, or extending through the blind center of the perforated plate. This type of perforated plate is, for example, shown in US2019/0076850, in combination with a grinder set. A perforated plate lacking blind center is also known in the art, e.g. as shown in US2009/0026295 in combination with a grinder set.

In an embodiment, the discharge mouths are arranged side-by-side relative to one another, e.g. in a rectilinear array, e.g. as illustrated in EP 1 749 444. For example, in the embodiment, three, four or more discharge mouths are arranged side-by-side, with the corresponding one flow channels assembly connecting to the outlet side of one chamber, e.g. the perforated plate having a multitude of perforations distributed within a circular area or an annular area of the perforated plate. For example, the inlet openings are elliptical and the discharge mouths circular.

In another embodiment, e.g. as discussed with reference to the drawings herein, the discharge mouths are arranged in a two-dimensional grid, e.g. four discharge mouths in a rectangular grid. For example, in the embodiment, four or more discharge mouths are arranged in a 2D-grid, with the corresponding one flow channels assembly connecting to the outlet side of one chamber, e.g. the perforated plate having a multitude of perforations distributed within a circular area or an annular area of the perforated plate.

In an embodiment, the flow channels assembly is arranged so that the discharge mouths are located in a horizontal plane, e.g. with the flow through the flow channels being upward, for example a mobile mould member being movable in a horizontal plane over the discharge mouths.

In an embodiment, the multitude of perforations in the perforated plate are arranged in multiple clusters, each cluster corresponding to one of the mentioned subsets of perforations. Herein a cluster of perforations is arranged in zone having a shape in conformity with the shape of corresponding flow channel inlet opening. The spacing between neighbouring clusters is blind, so lacking perforations. This may, for example, allow for a sturdy embodiment of the flow channels assembly at the inlet side thereof, e.g. avoiding the need for thin and fragile edges between adjacent flow channel inlet openings in the assembly.

As discussed already, in embodiments, a grinder set comprising one or more grinder members is arranged in the chamber. Herein at least one of the grinder members is a mobile grinder member that is driven by a grinder drive, e.g. an electric motor, e.g. via a rotary drive shaft on which the mobile grinder member is mounted. The grinder set is operated to grind the fibrous foodstuff mass. As already illustrated, many grinder sets are known to the skilled person and can be implemented in the context of the present invention.

In embodiments, at least one mobile grinder member is arranged adjacent the inlet face of the perforated plate and cooperates with the perforated plate to grind the fibrous foodstuff mass. This arrangement, e.g., may not only serve for a final grinding of the fibrous material, but may also serve to avoid clogging of the perforated plate.

In practical embodiments, the at least one mobile grinder member is a rotary grinder member that is rotated about an axis perpendicular to the inlet face of the perforated plate. For example, the rotary grinder member has a central hub joined to a rotary drive shaft.

In embodiments, a flow restrictor is arranged within the chamber, upstream from the grinder set. The flow restrictor is configured to enhance uniformity of the flow of foodstuff mass towards the grinder set, e.g. avoiding uneven loading of mass into the grinder set. In general terms, the restriction provided by the restrictor serves to cancel effects in the stream of mass via the inlet into the chamber that would result in non-uniformity in the loading of the grinder set, e.g. the main direction of this flow at the inlet (e.g. when the inlet is perpendicular to the main axis of the grinder set), differences in flow speed of the mass at the inlet, etc.

In embodiments, a rotary grinder member is mounted on a rotary drive shaft that extends into the chamber, perpendicular to the inlet face of the perforated plate. Herein the flow restrictor defines a locally reduced annular cross-section about the rotary drive shaft for the foodstuff mass passing from the inlet of the chamber to the grinder set. This, for example, is advantageous in combination with an inlet of the chamber that is angled, e.g. perpendicular, to the rotary drive shaft). The flow will then have to change into a flow generally parallel to the drive shaft in order to pass through the reduced annular cross-section.

In a practical embodiment, the flow restrictor comprises an annular flange that is arranged within the chamber, the outside of the flange adjoining the chamber wall, which flange has a central opening therein that is larger than the diameter of the rotary drive shaft so as to define a locally reduced annular cross-section for the foodstuff mass between the drive shaft and the annular flange.

In a practical embodiment, the flow restrictor comprises a disc that is mounted on the rotary drive shaft so as to define a locally reduced annular cross-section for the foodstuff mass between the disc and the chamber wall.

In an embodiment, the flow restrictor comprises a labyrinth arrangement formed by at least one annular flange and at least one disc as described above, these elements being axially offset from one another in direction of the drive shaft.

In embodiments, the production device comprises a mobile mould member that is provided with multiple mould cavities, wherein the mobile mould member is moved along a path, and wherein the discharge mouths are arranged relative to said path so that when said multiple mould cavities are arranged at a fill position thereof, each of the discharge mouths is in communication with a respective mould cavity and a portion of the bundle of foodstuff mass is discharged from said discharge mouth into the mould cavity to form the product, wherein the mobile mould member is then moved so that the filled mould cavities are in a product release position thereof, where the moulded three dimensional food products are released from the mould cavities. In embodiments, the mould member is temporarily stationary, e.g. by the mould drive being an indexed drive, or slowed down when at or passing the fill position, allowing a portion of the bundle to stream into the mould cavity without undue disturbance of the orientation of the fibres in the portion. Once the cavity has been filled by the portion, the mould member is advanced, or accelerated, again towards the release position.

In the context of the present invention, the mobile mould member can be, for example, a reciprocating mould plate as known from plate-formers, a revolving mould disc as known from turret-type formers, or a mould drum as known from drum formers.

In a practical embodiment, the production device comprises a mould drum having an outer circumferential drum surface and a longitudinal drum rotation axis, the mould drum being rotatable supported by a frame of the device to revolve about the drum rotation axis, wherein the outer circumferential drum surface comprises multiple circumferential arrays of mould cavities, wherein the circumferential arrays are located at distinct positions in the direction of the longitudinal drum rotation axis. Herein, in each circumferential array, multiple mould cavities are present at spaced locations in circumferential direction of the drum surface, each mould cavity having a fill opening for introduction of foodstuff mass into the mould cavity. The discharge mouths are each aligned with a corresponding one of these circumferential arrays of mould cavities of the mould drum, so that a portion of the bundle of foodstuff mass is transferred from each discharge mouth into a mould cavity of the corresponding circumferential array of the revolving mould drum when the fill opening of a mould cavity is in communication with the discharge mouth opening at a fill position. As explained, this may be done whilst the drum is temporarily stationary or moving slowly at the fill position. The foodstuff mass forms a food product in the mould cavity. The formed food product is released from the mould cavity at a release position that is remote from the fill position, e.g. onto a belt or other conveyor extending underneath the drum at the release position as is known in the art.

As explained already, in embodiments the production device is provided with, or embodied as, a bundle severing assembly that is configured and operated to sever the bundles that are discharged from the discharge mouths in order to sever individualized portions from the bundles. So, in an embodiment, the severed portions form the actually produced food products, e.g. blocks of ground meat. In other embodiments, the severed portions are subjected to a further production step to arrive at the actually produced product.

In an embodiment, e.g. as in EP 1 749 444, the production device comprises a belt conveyor having a belt, wherein the discharge mouths are arranged above the belt conveyor, e.g. side-by side and transverse to the longitudinal axis of the belt, wherein the bundle severing assembly is arranged in proximity of the discharge mouths so that the individualized portions are received on the belt, e.g. they drop onto the belt.

In an embodiment, e.g. generally as in US2016/0271819, the production device comprises a belt conveyor having a belt, wherein the discharge mouths are arranged above the belt conveyor, e.g. side-by side and transverse to the longitudinal axis of the belt, so that the bundles are received on the belt, wherein the severing assembly is arranged downstream of the discharge mouths and is configured and operated to sever the bundles that have been received on the belt so as to form the individualized portions.

In an embodiment, the production device comprises a presser assembly which compresses the individualized portions resting on the belt, e.g. compressing the individualized portions vertically and/or horizontally, into a final shape of the three dimensional product. For example, as in e.g. generally as in WO2008/091634, the compression can be primarily vertical, e.g. to produce a hand style or home style meat product, e.g. hamburger. In another embodiment, the compression can be horizontal, or the combination of vertical and horizontal, e.g. as disclosed in US2004/0155129.

In embodiments, the flow channels assembly is temperature controlled by an associated heat exchange assembly, e.g. a heater assembly. For example, the flow channels assembly is provided with one or more ducts through which a heat exchange liquid is circulated allowing for temperature control of the assembly and thereby of the mass in the bundles. This may, for example, be of use to influence the friction between the bundle and the flow channel.

In embodiments, the chamber is temperature controlled by an associated heat exchange assembly, e.g. a heater assembly. For example, the chamber is provided with one or more ducts through which a heat exchange liquid is circulated.

In embodiments, use is made of a pressure sensor assembly that is configured and operated to sense the pressure of the foodstuff mass in at least one flow channel of the flow channels assembly. For example, the pressure sensor assembly is linked to the foodstuff mass feed and pressurization system for controlling the pressure of the foodstuff that is fed into the chamber. In an embodiment, multiple pressure sensors are provided, each one for each flow channel, e.g. allowing to monitor the operation of the system, e.g. allowing to detect local clogging of the perforated plate interfering with the flow of strands into a channel, etc.

The present invention also relates to a system for creating multiple coherent bundles of strands of fibrous foodstuff material from a mass of pumpable fibrous foodstuff material, for example from ground meat, and for providing said bundles to a production device that is configured to produce three dimensional products, each product out of a portion of a bundle discharged from a discharge mouth of the system.

In the inventive system the chamber has an inlet connectable to a foodstuff mass feed and pressurization assembly, e.g. a pump, e.g. a rotary vane pump, a (multi-)piston pump, a dual lobe pump, configured to feed mass of pumpable fibrous foodstuff material into the chamber via the inlet thereof. A perforated plate is stationary arranged at an outlet side of the chamber, which perforated plate has a multitude of perforations therein between an inlet face of the perforated plate directed towards said chamber and an opposed outlet face of the perforated plate.

The system comprises a flow channels assembly that connects to the outlet side of the chamber, which assembly comprises multiple flow channels, each flow channel having a flow channel inlet opening, a flow channel discharge mouth, and a flow channel length. The flow channel inlet openings are stationary arranged adjoining the outlet face of the perforated plate, so that, in operation of the system, each flow channel receives therein strands of fibrous foodstuff material emerging at the outlet face of the perforated plate from a subset of the multitude of perforations in the perforated plate.

The flow channels are configured so that, in operation, the strands that are introduced into a flow channel merge into a coherent bundle, in which the strands are arranged against one another in a generally parallel orientation as explained above. The flow channels are configured so that, in operation, the bundle is confined within the flow channel and passes through the flow channel to the discharge mouth where the bundle is discharged, whilst maintaining the generally parallel orientation of the strands in the bundle.

A production device is arrangeable at the discharge mouths of the flow channels assembly, which production device is configured to produce three-dimensional products, each product out of a portion of a bundle discharged from the discharge mouth.

In embodiments, downstream of the respective inlet opening, each flow channel comprises a converging section in which the cross-sectional area of the flow channel gradually reduces, thereby, in operation, gradually compressing the strands into the coherent bundle.

In embodiments, the flow channels are each devoid of an internal divider so that, in operation, one coherent bundle is discharged from one discharge mouth opening.

In embodiments, the flow channel inlet openings all have substantially the same cross-sectional surface, the discharge mouths all have substantially the same cross-section surface, and the flow channels are all configured to provide substantially the same flow resistance to the bundle passing there through from the flow channel inlet opening to the discharge mouth.

In embodiments, for each flow channel, the flow channel discharge mouth has a cross-sectional shape that differs from the cross-sectional shape of the flow channel inlet opening, wherein the flow channel comprises a shaping section having a gradually changing cross-sectional shape, wherein, in operation, the bundle is confined within the flow channel and is gradually shaped into said cross-sectional shape of the discharge mouth whilst maintaining the generally parallel orientation of the strands in the bundle.

In embodiments, the multitude of perforations in the perforated plate are distributed within a circular area or annular area of the perforated plate, wherein the inlet opening of each of the flow channels is configured with a cross-sectional surface that corresponds to a circular sector or an annular sector of the area in which the multitude of perforations are distributed.

In embodiments, the discharge mouths are arranged side-by-side relative to one another, e.g. in a rectilinear array, e.g. three, four, five, or even more discharge mouths.

In embodiments, the discharge mouths are arranged in a two-dimensional grid, e.g. four discharge mouths in a rectangular grid.

In embodiments, the multitude of perforations in the perforated plate are arranged in clusters, each cluster corresponding to one of said subsets of perforations, wherein a cluster of perforations is arranged in zone having a shape in conformity with the shape of corresponding flow channel inlet opening.

In embodiments, a grinder set comprising one or more grinder members is arranged in the chamber, at least one of said grinder members being a mobile grinder member that is drivable by a grinder drive, wherein, in operation, the fibrous foodstuff mass is ground by the one or more mobile grinder members.

In embodiments, at least one mobile grinder member is arranged adjacent the inlet face of the perforated plate and cooperates with the perforated plate allowing to grind the fibrous foodstuff mass.

In embodiments, the at least one mobile grinder member is a rotary grinder member that is rotatable about an axis perpendicular to the inlet face of the perforated plate, e.g. wherein the rotary grinder member has a central hub joined to a rotary drive shaft.

In embodiments, a flow restrictor is arranged within the chamber, upstream from the grinder set, said flow restrictor being configured to enhance uniformity of the flow of foodstuff mass towards the grinder set.

In embodiments, a rotary grinder member is mounted on a rotary drive shaft that extends into the chamber, perpendicular to the inlet face of the perforated plate, wherein the flow restrictor defines a locally reduced annular cross-section about the rotary drive shaft for the foodstuff mass passing from the inlet of the chamber to the grinder set.

In embodiments, the flow restrictor comprises an annular flange that is arranged within the chamber and has a central opening therein larger than the diameter of the rotary drive shaft so as to define a locally reduced annular cross-section for the foodstuff mass between the drive shaft and the annular flange, and/or the flow restrictor comprises a disc that is mounted on the rotary drive shaft so as to define a locally reduced annular cross-section for the foodstuff mass between the disc and the chamber.

In embodiments, the flow channels assembly is temperature controllable by an associated heat exchange assembly of the system, e.g. a heater assembly, e.g. the flow channels assembly being provided with one or more ducts through which a heat exchange liquid is circulated.

In embodiments, the chamber is temperature controllable by an associated heat exchange assembly of the system, e.g. a heater assembly, e.g. the chamber being provided with one or more ducts through which a heat exchange liquid is circulated.

In embodiments, the system comprises a pressure sensor assembly configured to sense the pressure of the foodstuff mass in at least one flow channel of the flow channels assembly, e.g. the pressure sensor assembly being connected to the foodstuff mass feed and pressurization system for controlling the pressure of the foodstuff fed into the chamber.

The present invention also relates to an installation for the production of three-dimensional products from a mass of pumpable fibrous foodstuff material, for example from ground meat. The installation comprises:
 a foodstuff mass feed and pressurization assembly,
 a system as described herein, e.g. according to any one or more of the claims,
  wherein the foodstuff mass feed and pressurization assembly is configured to feed mass of pumpable fibrous foodstuff material into the chamber of the system via the inlet thereof,
 a production device that is arranged at the discharge mouths of the flow channels assembly of the system, which production device is configured to produce three dimensional products, each product out of a portion of one bundle that is discharged from a discharge mouth of the flow channels assembly.

In embodiments of the installation, the production device comprises a mobile mould member that is provided with multiple mould cavities, wherein the mobile mould member is moved along a path, and wherein the discharge mouths are arranged relative to said path so that when said multiple mould cavities are arranged at a fill position thereof, possibly being temporarily stationary at said fill position, each of the discharge mouths is in communication with a respective mould cavity and a portion of the bundle of foodstuff mass is discharged from said discharge mouth into the mould cavity to form the product, wherein the mobile mould member is then moved so that the filled mould cavities are in a product release position thereof, where the moulded three dimensional food products are released from the mould cavities.

In embodiments of the installation, the production device comprises a mould drum having an outer circumferential drum surface and a longitudinal drum rotation axis, the mould drum being rotatably supported by a frame of the production device to revolve about the drum rotation axis, wherein said outer circumferential drum surface comprises multiple circumferential arrays of mould cavities, wherein the circumferential arrays are located at distinct positions in the direction of the longitudinal drum rotation axis,
 wherein, in each circumferential array, multiple mould cavities are present at spaced locations in circumferential direction of the drum surface, each mould cavity having a fill opening for introduction of foodstuff mass into the mould cavity,
 wherein the discharge mouths are each aligned with a corresponding one of said circumferential arrays of mould cavities of the mould drum, so that a portion of the bundle of foodstuff mass is transferred from each discharge mouth into a mould cavity of the corresponding circumferential array of the revolving mould drum when the fill opening of a mould cavity is in communication with the discharge mouth opening at a fill position, possibly being temporarily stationary at said fill position, said foodstuff mass forming a food product in said mould cavity, wherein the formed food product is released from the mould cavity at a release position remote from the fill position.

In embodiments of the installation, the production device is provided with, or embodied as, a bundle severing assembly that is configured and operated to sever the bundles discharged from the discharge mouths in order to sever individualized portions from the bundles.

In embodiments of the installation, the production device is provided with a bundle severing assembly that is configured and operated to sever the bundles discharged from the discharge mouths in order to sever individualized portions from the bundles, wherein the production device further comprises a belt conveyor having a belt, and wherein the discharge mouths are arranged above the belt conveyor, and wherein the bundle severing assembly is arranged in proximity of the discharge mouths so that said individualized portions are received on the belt, e.g. they drop onto the belt after having been severed.

In embodiments of the installation, the production device is provided with a bundle severing assembly that is configured and operated to sever the bundles discharged from the discharge mouths in order to sever individualized portions from the bundles, wherein the production device further comprises a belt conveyor having a belt, and wherein the discharge mouths are arranged above the belt conveyor so that the bundles are received on the belt, and wherein the bundle severing assembly is arranged downstream of the discharge mouths and is configured and operated to sever the bundles that have been received on the belt so as to form said individualized portions.

In embodiments of the installation, the production device comprises a presser assembly which is configured and operate to compress the individualized portions on the belt, e.g. compressing the individualized portions vertically and/or horizontally, into a final shape of the three dimensional product. Examples of presser assemblies are disclosed in WO2008/091634 and US2004/0155129.

The present invention also relates to a flow channels assembly as described herein, configured for arrangement between the chamber and the production device.

The invention also relates to the use of such a flow channels assembly in a method, system, and installation as described herein. For example, the flow channels assembly is made by an additive manufacturing technique, e.g. 3D printing, e.g. of plastic or metal material. For example, the flow channels assembly is made as one monolithic printed body or multiple bodies that are stackable, e.g. stackable in series.

BRIEF DESCRIPTION OF THE DRAWINGS

The invention will now be explained with reference to the drawings. In the drawings.

DETAILED DESCRIPTION OF VARIOUS EMBODIMENTS

Figure 1:
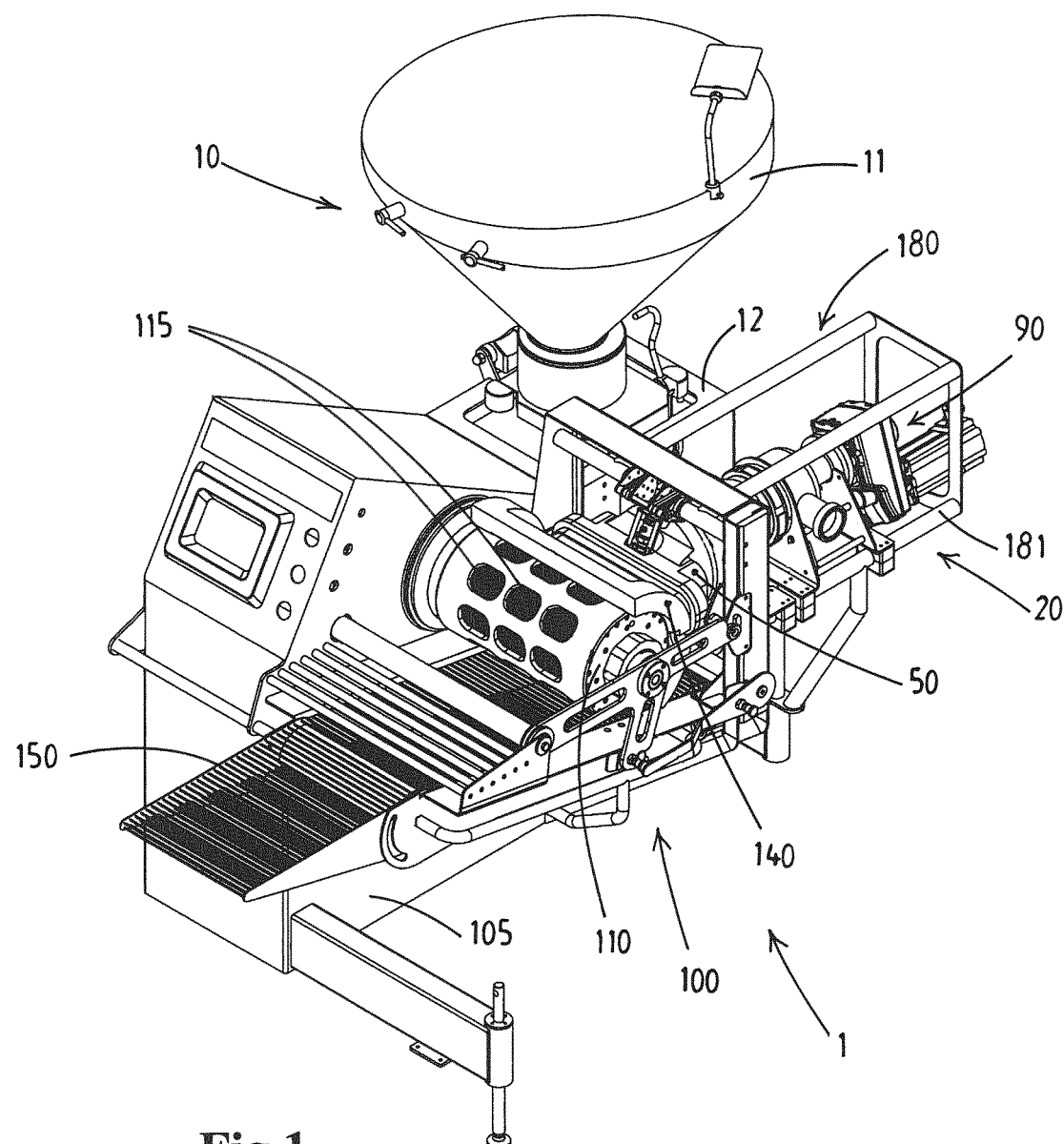
FIG. 1 shows an example of an installation according to the invention.
Figure 2:
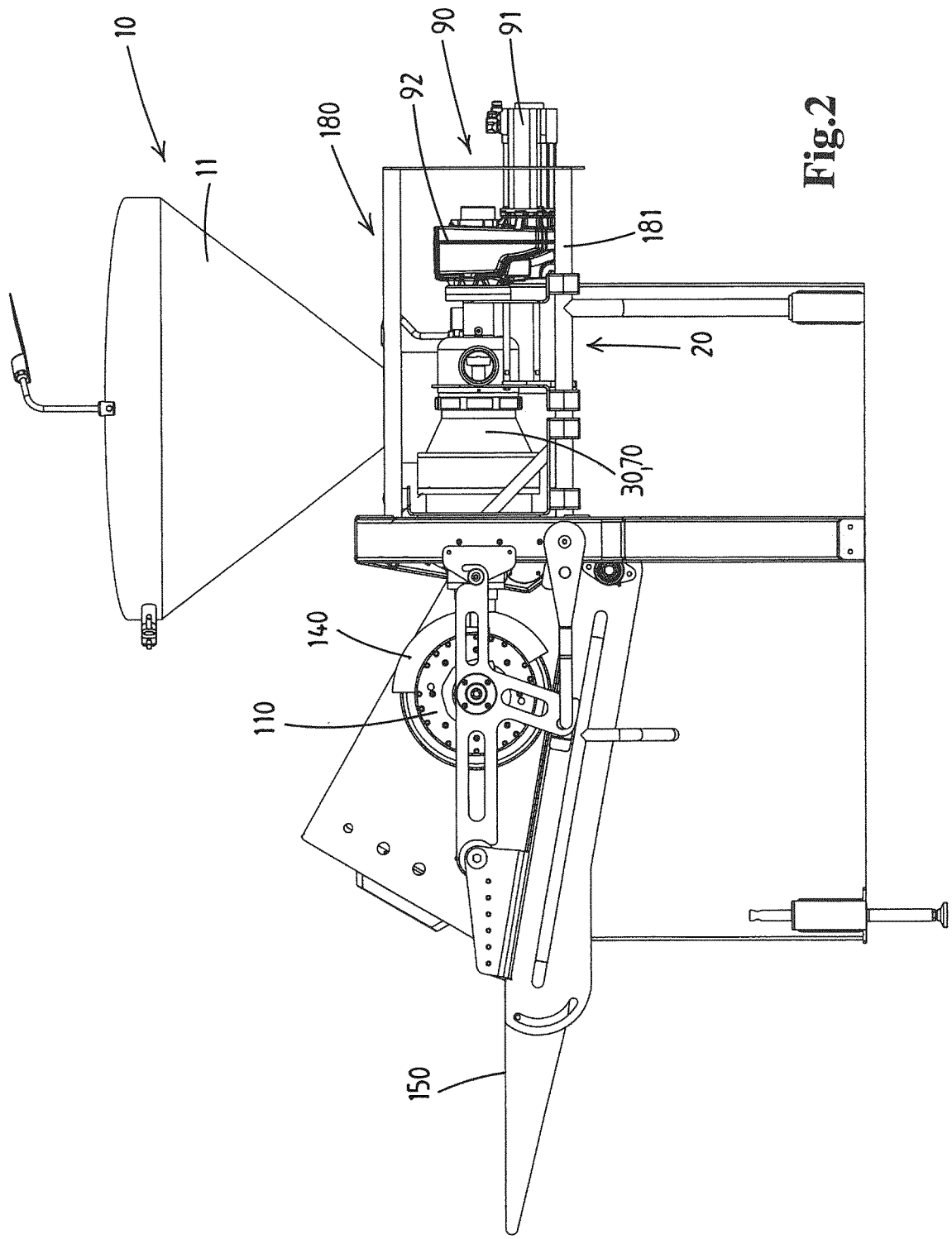
FIG. 2 the installation of FIG. 1 in side view.
Figure 3:
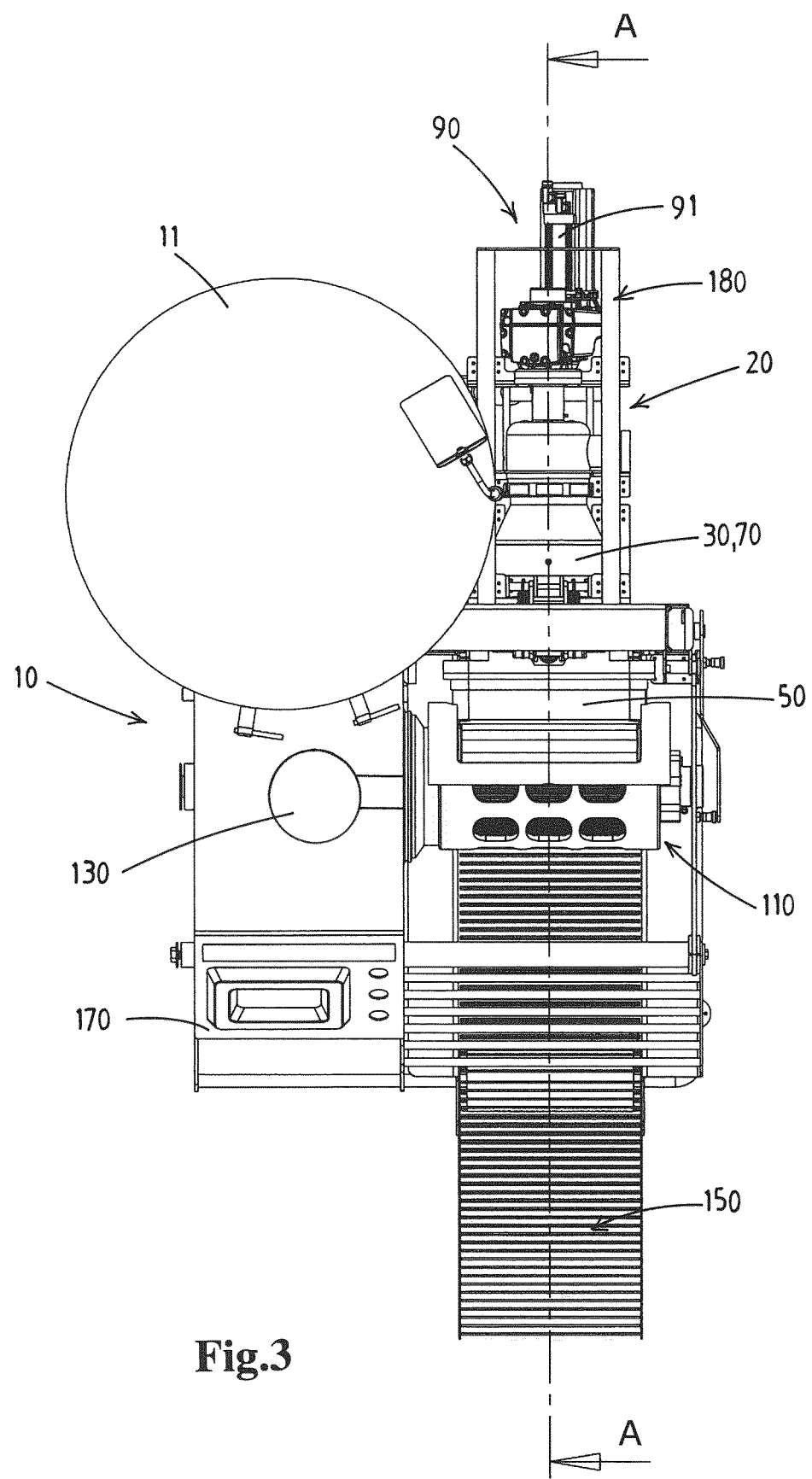
FIG. 3 the installation of FIG. 1 in top view.
Figure 4:
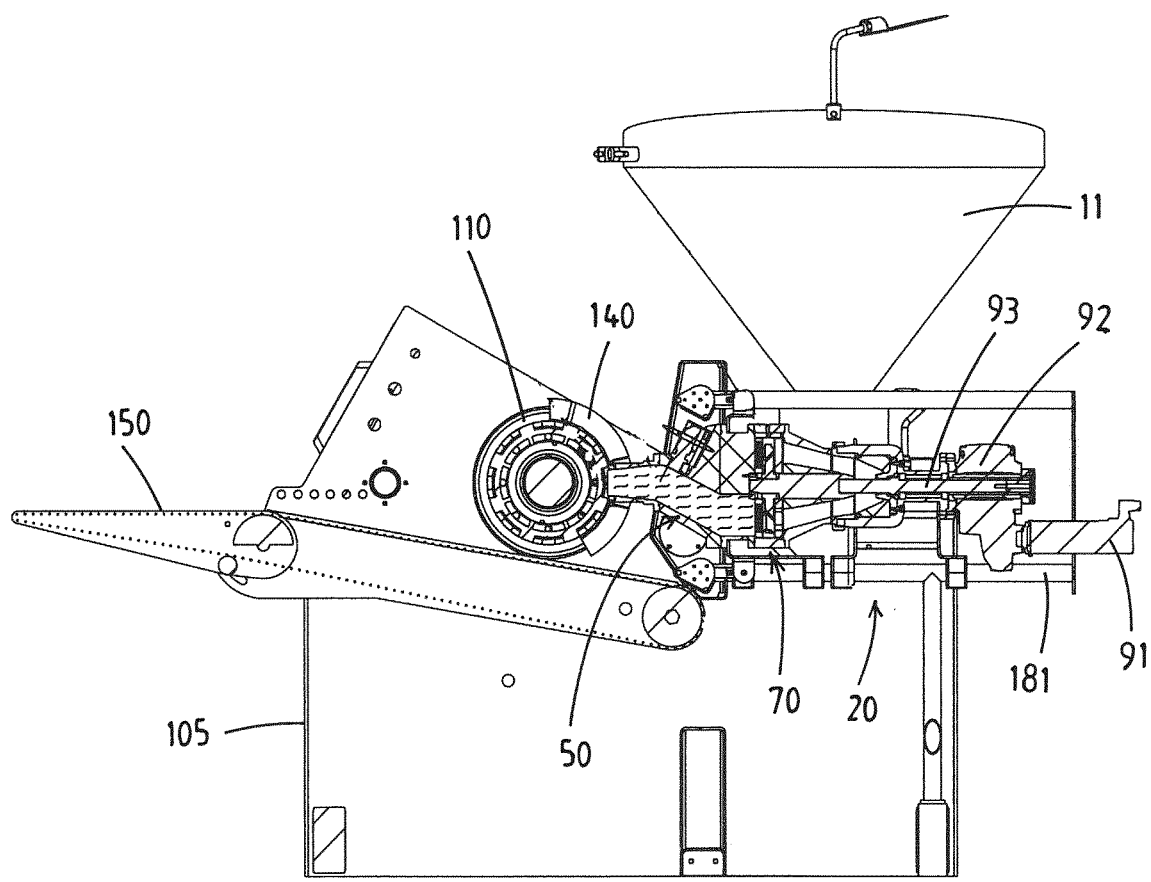
FIG. 4 a longitudinal section of the installation of FIG. 1 over the line A-A in FIG. 2, FIG. 5 the system for creating multiple coherent bundles of the installation in FIG. 1, FIG. 6 the system of FIG. 5 from another angle, FIG. 7 the system of FIG. 5 wherein a part of the chamber housing is left out to show the inside thereof, FIG. 8 the system of FIG. 7 from another angle, FIG. 9 a part of FIG. 4 on a larger scale, FIG. 10 a part of FIG. 9 on a larger scale.
Figure 5:
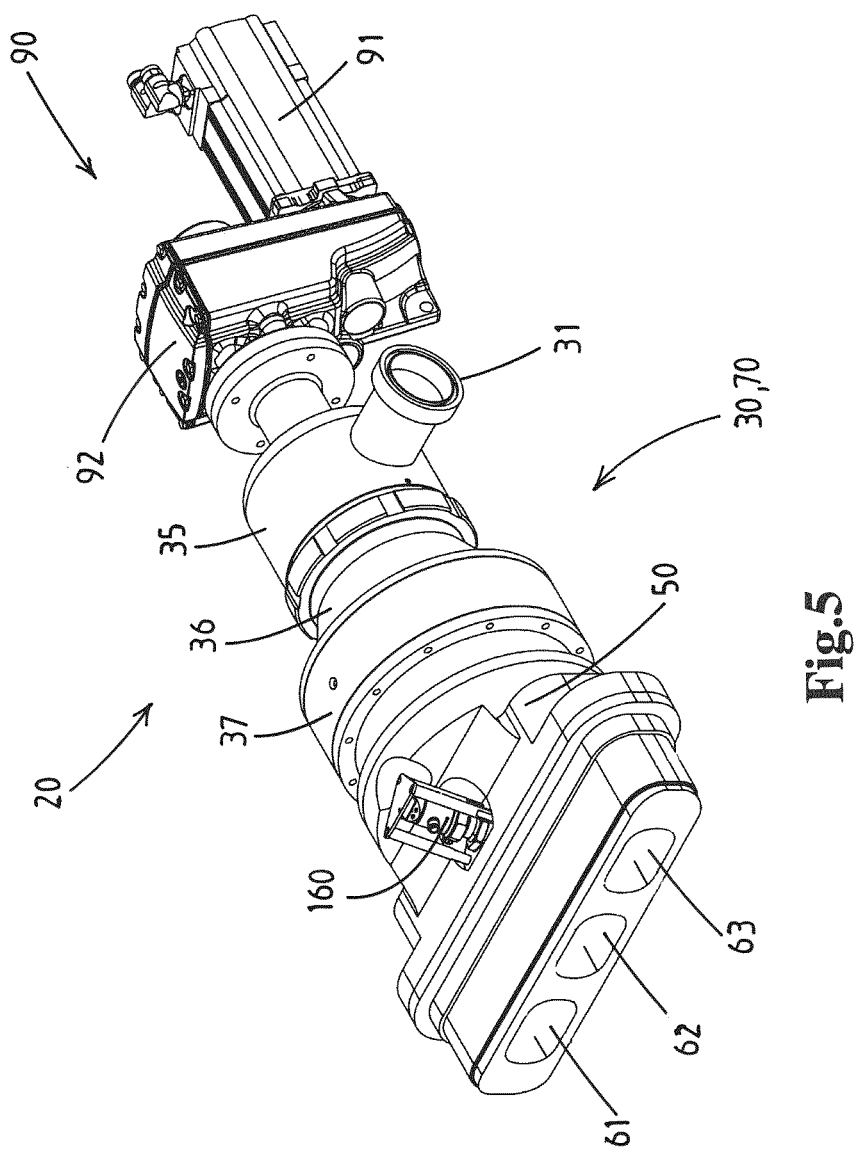
Figure 6:
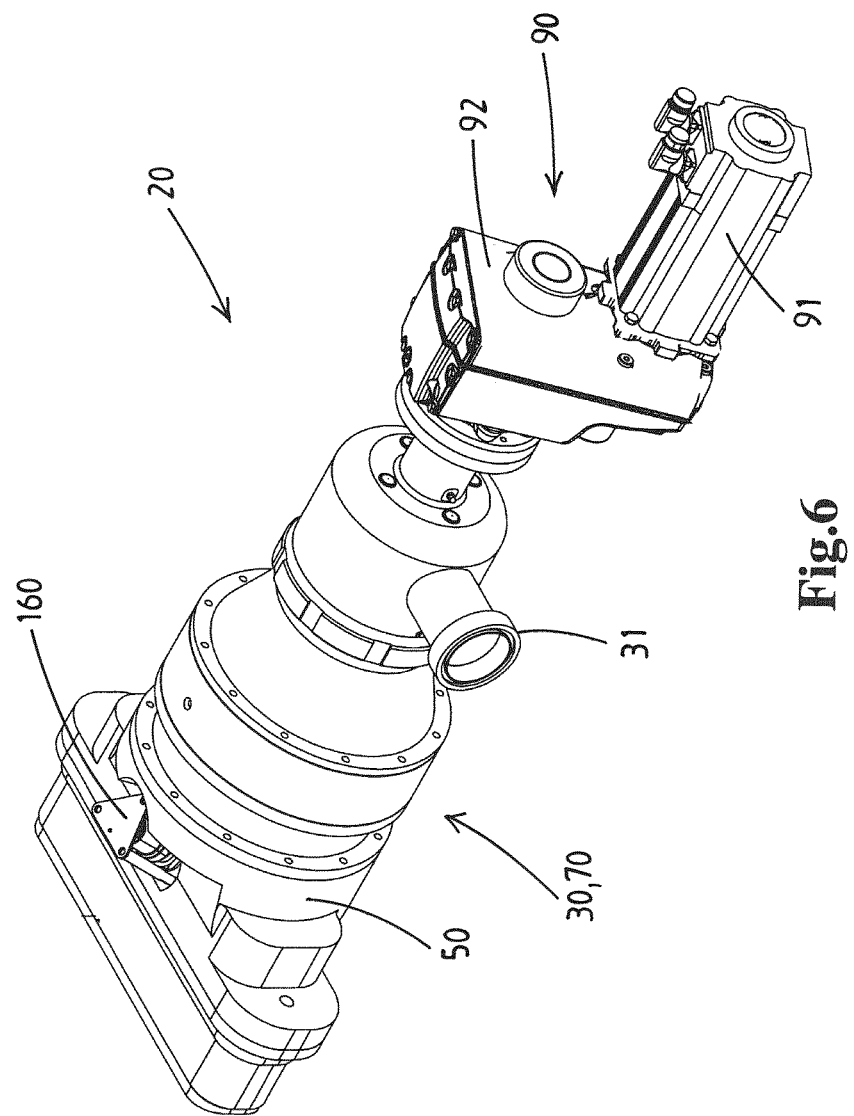
Figure 7:
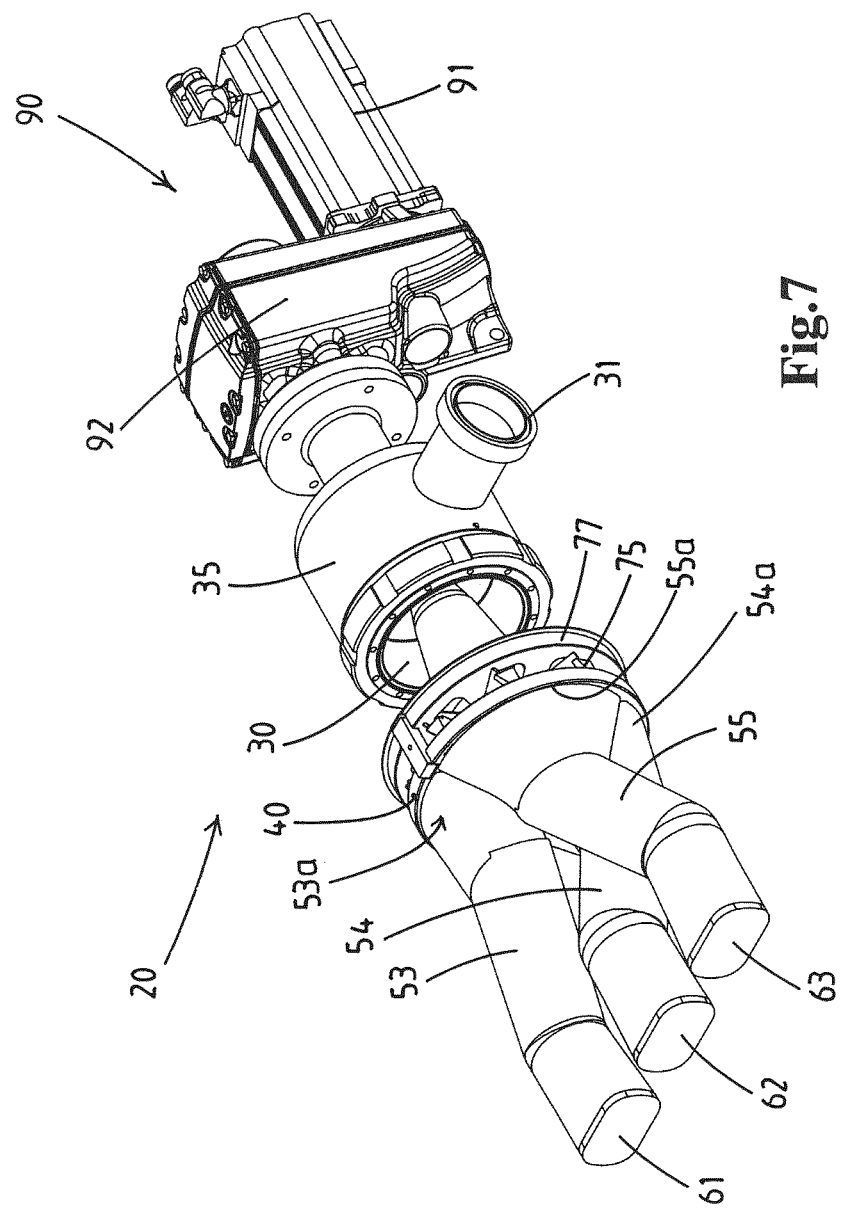
Figure 8:
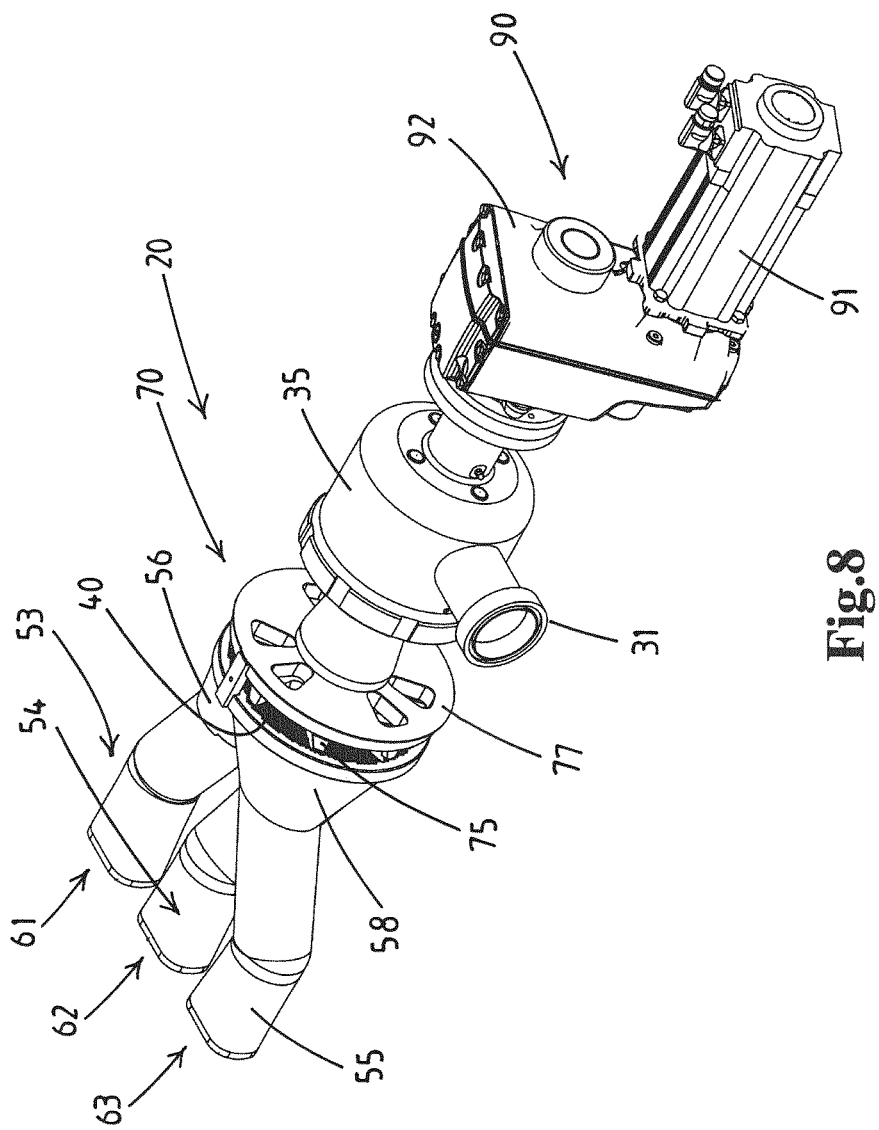
Figure 9:
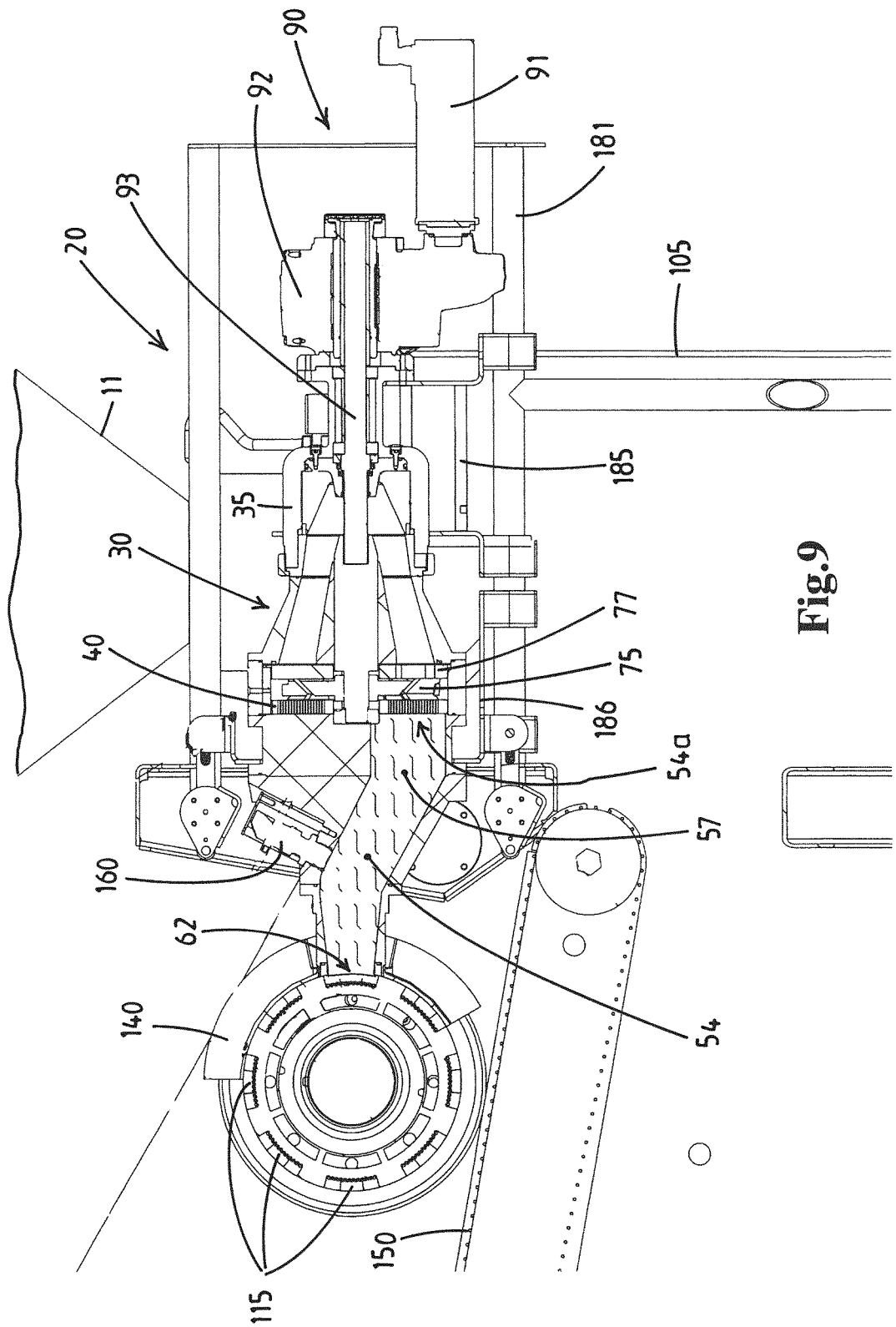
Figure 10:
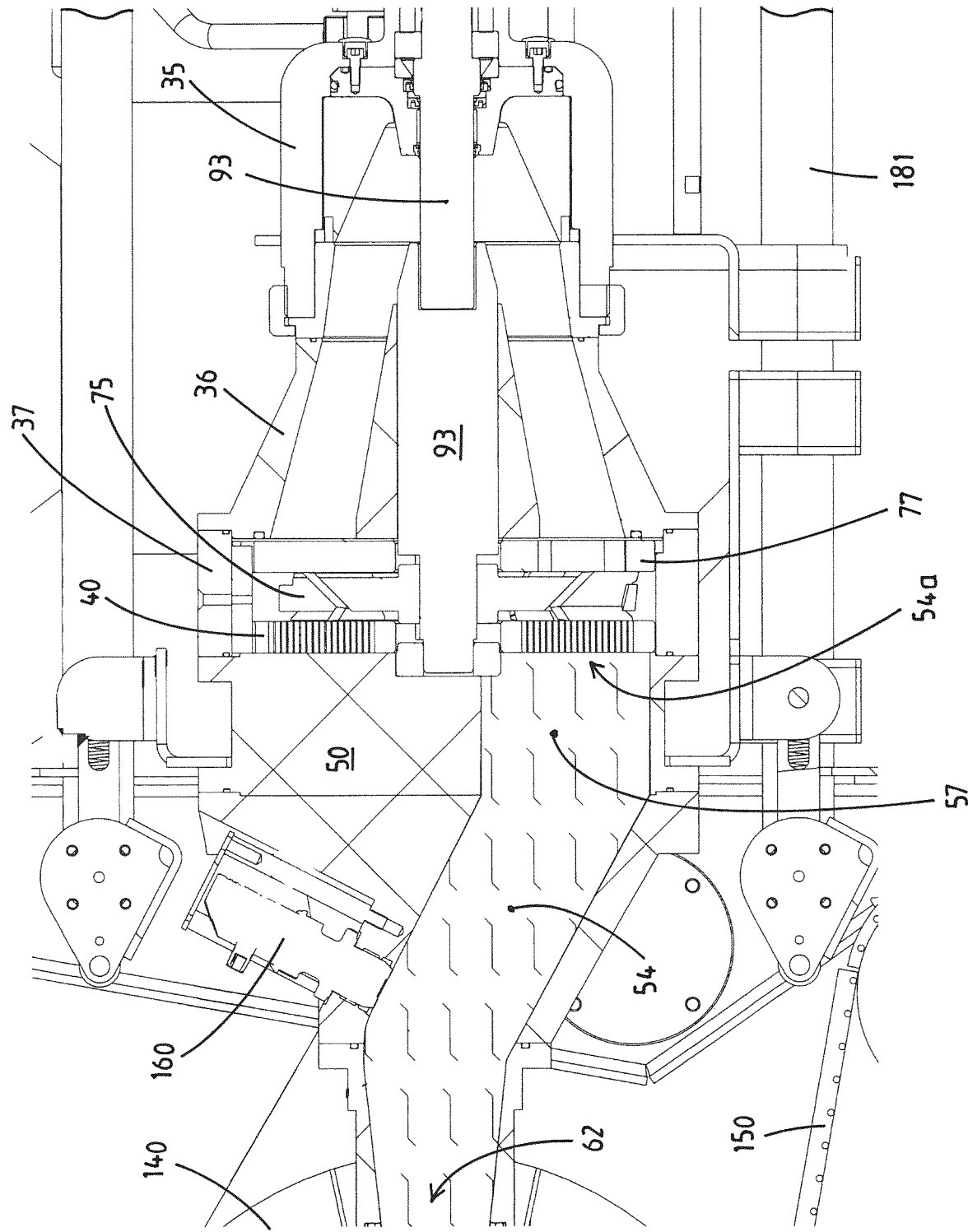
Figure 11:
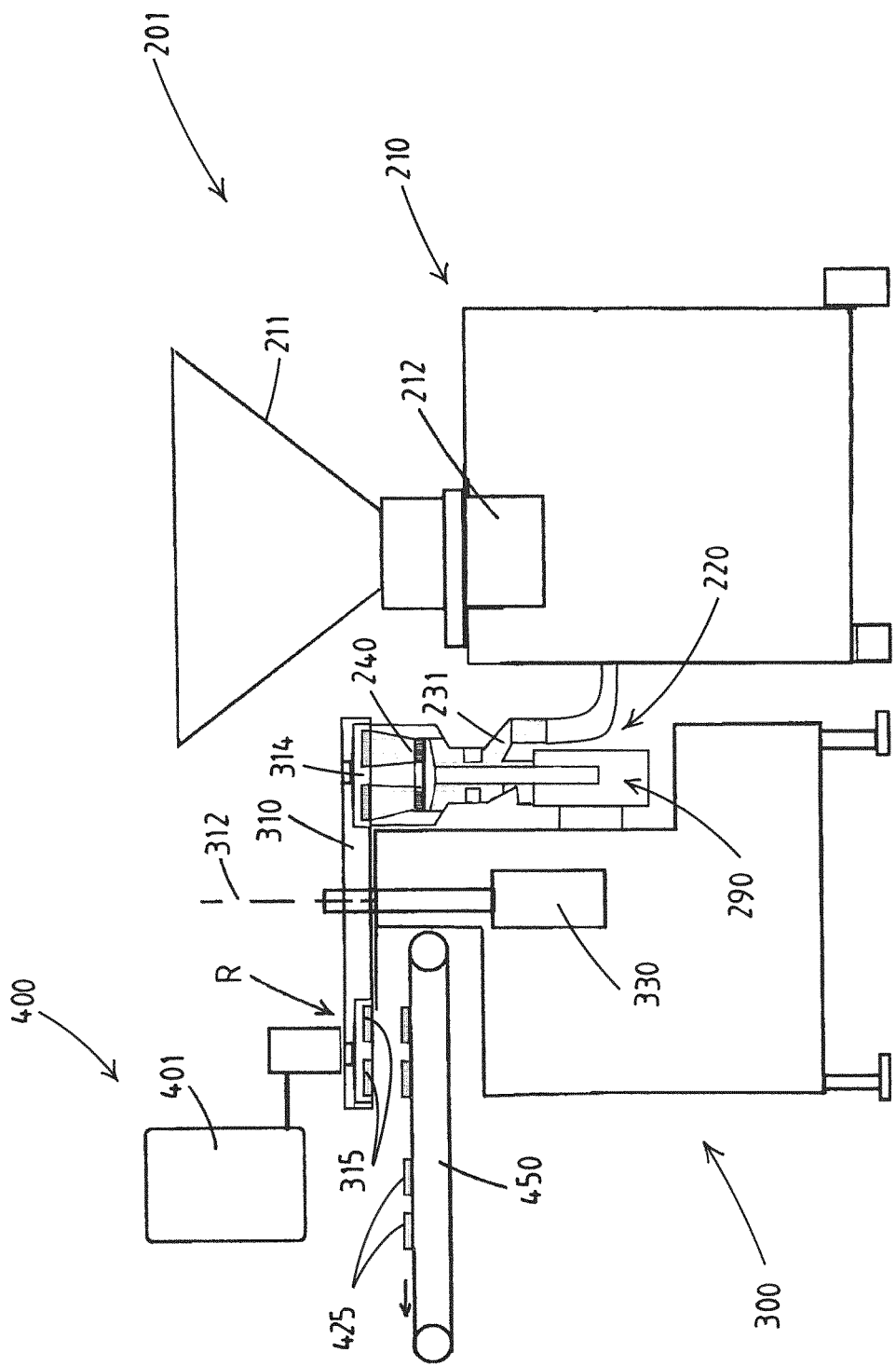
FIG. 11 illustrates another example of an installation according to the invention.

With reference to FIGS. 1-10 an embodiment of an installation 1 according to the invention, as well as the operation thereof, for the production of three-dimensional products from a mass of pumpable fibrous foodstuff material, is discussed below. For example, the foodstuff material is ground meat. The ground meat can be red meat, white meat (e.g. chicken meat), or fish meat.

In general, the installation 1 comprises:
a foodstuff mass feed and pressurization assembly 10,
a system 20 for creating multiple coherent bundles of strands of fibrous foodstuff material from a mass of pumpable fibrous foodstuff material, and for providing these bundles to a production device of the installation that is configured to produce three dimensional products, each product out of a portion of a bundle discharged from a discharge mouth of a flow channels assembly 50 of the system, wherein the assembly 10 is configured to feed mass of pumpable fibrous foodstuff material into a chamber 30 of the system 20 via the inlet 31 thereof,
a production device 100 that is arranged at the discharge mouths 61, 62, 63 of the flow channels assembly 50 of the system, which production device is configured to produce three dimensional products, each product out of a portion of one bundle that is discharged from a discharge mouth of the flow channels assembly.

The foodstuff mass feed and pressurization assembly 10 here comprises:
a hopper 11 configured to receive therein pumpable fibrous foodstuff material, e.g. ground meat,
a motor driven pump 12 having an inlet connected to the hopper 11 and an outlet from which a pressurized mass of fibrous foodstuff material emerges.

For example, the pump 12 is a rotary vane pump, e.g. as marketed by Risco or Handtmann for use in the food industry, e.g. for pumping ground meat.

The pump 12 supplies the mass, e.g. continuously, e.g. at a controlled pressure, to the system 20.

An embodiment of the system 20 will be described in detail further below. In general terms, the system 20 comprises:
the chamber 30 having the inlet 31 connected to the foodstuff mass feed and pressurization assembly, here to the outlet of pump 12, and having an outlet side 32,
a perforated plate 40 that is stationary arranged at the outlet side 32 of the chamber 30, which perforated plate has a multitude of perforations therein between an inlet face of the perforated plate that is directed towards the chamber and an opposed outlet face of the perforated plate 40,
a flow channels assembly 50 that connects to the outlet side 32 of the chamber 30,
which flow channels assembly comprises multiple flow channels 53, 54, 55, each flow channel having a flow channel inlet opening 53a, 54a, 54b, a flow channel discharge mouth 61,62,63, and a flow channel length, as shown the discharge mouths are arranged side-by-side relative to one another, in a rectilinear array. The flow channel length may vary yet is never nil in order to obtain the effect of merging the strands into a coherent bundle.

The flow channel inlet openings 53*a*, 54*a*, 55*a* are stationary arranged adjoining the outlet face of the perforated plate 40, so that, in operation, each flow channel 53,54,55 receives therein strands of fibrous foodstuff material emerging at the outlet face of the perforated plate 40 from a subset of the multitude of perforations in the perforated plate.

The flow channels 53, 54, 55 are configured so that, in operation, the strands that are introduced into a flow channel merge into a coherent bundle, in which the strands are arranged against one another in a generally parallel orientation.

The flow channels are configured so that, in operation, said bundle is confined within the flow channel and passes through the flow channel 53, 54, 55 to the discharge mouth 61, 62, 63 where the bundle is discharged, whilst maintaining the generally parallel orientation of the strands in the bundle.

As will be apparent to the skilled person, in the exemplary embodiment, the production device comprises a mould drum 110 having an outer circumferential drum surface 111 and a longitudinal drum rotation axis 112. The mould drum is rotatably supported by a frame 105 of the device 100 to revolve about the drum rotation axis 112, here a horizontal axis as preferred.

The outer circumferential drum surface 112 comprises multiple circumferential arrays of mould cavities 115. These circumferential arrays, here three but other numbers are also possible, are located at distinct positions in the direction of the longitudinal drum rotation axis 112. In each circumferential array, multiple mould cavities 115 are present at spaced locations in circumferential direction of the drum surface 112.

Each mould cavity 115 has a fill opening for introduction of foodstuff mass into the mould cavity.

The fill opening of each cavity 115 corresponds in shape and dimensions to the shape of the discharge mouth 61, 62, 63 from which a portion of the bundle is discharged into the cavity. This arrangement allows to maintain the fibre orientation in the formed product.

As illustrated, and as known in the art, the cavities 115 are also arranged in longitudinal rows, here of three cavities side-by-side, so that the system 20 fills all cavities in a row simultaneously.

In the depicted embodiment, the drum forms a periphery and bottom of each cavity 115, e.g. as a recess in a porous material portion of the drum, e.g. embodied as a porous material; insert, e.g. removable, of the drum. For example, as described in WO2004002229.

In another embodiment, the mould drum is embodied with an annular shell, wherein each cavity is embodied as a hole through the shell, with the production device having a stationary wear plate arranged on the inside of the shell. This is, for example, shown in WO2012012581, FIG. 20. In this embodiment, release of formed products from the cavities can be done by a knock-out mechanism as discussed in the WO2012012581 document.

The drum 110 is driven by a drive 130, e.g. including an electric motor, e.g. a variable speed drive, e.g. configured to allow for intermittent motion of the drum 110, e.g. stopping the drum 110 each time a row of cavities is placed opposite the discharge mouths 61, 62, 63.

The discharge mouths 61, 62, 63 are each aligned with a corresponding one of these circumferential arrays of mould cavities 115, so that a portion of the bundle of foodstuff mass is transferred from each discharge mouth into one opposed mould cavity 115 of the corresponding circumferential array of the mould drum 110 when the fill opening of a mould cavity is in communication with the discharge mouth opening at a fill position. As explained, this may be done whilst the drum is temporarily stationary or moving slowly at the fill position.

The foodstuff mass forms a food product in the mould cavity 115.

The formed food product is released from the mould cavity at a release position that is remote from the fill position, e.g. onto a belt 150 or other conveyor extending underneath the drum at the release position as is known in the art.

As known in the art, and as preferred in the context of the application, each mould cavity 115 has a mould cavity wall that is formed at least in part by a wall part with a porous structure, for example of porous metal, for example of porous sintered metal.

As known in the art, and as preferred in the context of the application, the installation comprises a pressurized air food product ejection system. Herein the mould drum 110 is provided with air ducts that extend to the cavities 115, which are configured to selectively connect the porous wall parts to a source of pressurized air (e.g. including a compressor and compressed air storage tank) configured to feed pressurized air, e.g. at a regulated ejection air pressure, to said air ducts in order to facilitate the release of the moulded product from the cavities, e.g. row per row.

As preferred, and as known in the art, the production device 100 having the drum 110 further comprises a shoe member 140 that has a curved face that extends about a section of the circumference of the drum 110 at the location of the discharge mouths 61, 62, 63, e.g. in direction of the rotation of the drum and/or counter to said direction. For example, the shoe member 140 serves to keep the cavities closed during a period immediately after filling. For example, the curved face is pressed onto the drum at a controllable pressure as is known in the art.

For example, as is known in the art, the shoe member 140 comprises a curved and flexible plastic shoe plate having a curvature which corresponds to the moulding drum, which shoe plate has a side by means of which the shoe plate sealingly bears against a cylindrical surface of the moulding drum. For example, a pneumatic or other pressure mechanism is provided to press the shoe plate onto the drum. The plate may extend in direction of the rotation of the drum and/or counter to said direction relative to the discharge mouths.

For example, the shoe member and the drum are embodied as disclosed in WO2014148897.

More details of the illustrated embodiment of system 20 will now be discussed.

The chamber 30 has a longitudinal main axis that is perpendicular to the plate 40, with the inlet 31 being offset in longitudinal direction from the plate 40.

The chamber 30 is delimited by a chamber housing, here composed of multiple chamber housing parts 35, 36, 37, that are axially stacked onto one another, preferably releasable.

The inlet 31 of the chamber 30 is connectable to the pump 12 via a hose (not shown).

The inlet 31 here is at an angle, here perpendicular to the main axis.

The inlet 31 is part of the housing part 35 remote from the plate 40.

The illustrated perforated plate 40 has a blind center, so lacking perforations in the center, e.g. in view of the grinder shaft 93 being supported on, here extending through the blind center of the perforated plate 40.

A grinder set 70 comprising one or more grinder members is arranged in the chamber 30. Here, one of the grinder members is a mobile grinder member 75 that is drivable by a grinder drive 90. This mobile grinder member 75 is arranged adjacent the inlet face of the perforated plate 40 and cooperates with the perforated plate allowing to grind the fibrous foodstuff mass. The mobile grinder member 75 is a rotary grinder member that is rotatable about an axis perpendicular to the inlet face of the perforated plate 40. As shown, the rotary grinder member 75 has a central hub that is joined to rotary grinder drive shaft 93 driven by grinder motor 91 via transmission 92.

In operation, the fibrous foodstuff mass is ground by the mobile grinder member 75.

The grinder set 70 also comprises a stationary grinder member 77, directly upstream of the mobile grinder member 75. The stationary grinder member 77 has a number of large holes through which the mass reaches the mobile grinder member 75, such an arrangement is known in the field of meat grinding. In another embodiment, the set 70 may comprise a further mobile grinder member and, possibly, a further stationary grinder member, all grinder members in an axial stack in the grinder set.

As preferred, for one mould drum and for all discharge mouths required to transfer mass into the cavities of the one mould drum, just one system 20 is provided for, having one chamber 30 and one associated flow channels assembly 50, possibly with a grinder set 75 in the chamber 30. For a longer drum 110, for example, it could also be a consideration to provide two systems 20, each with its own chamber 30 and its own flow channels assembly 50, as well as (possibly) a grinder set 75 in the chamber of each system. These two systems could have the inlets of the chambers connected to a single pump when desired.

The FIGS. 1-10 illustrate that, the multitude of perforations in the perforated plate 40, having a blind center, are distributed within an annular area of the perforated plate. The inlet opening 53a, 54a, 55a, of each of the flow channels is configured with a cross-sectional surface that corresponds to the annular sector of the area in which the multitude of perforations are distributed. This shape differs significantly from the shape of each of the discharge mouths 61, 62, 63. The flow channels are generally designed to receive the strands emerging from the perforated plate 40, bundle them into a coherent bundle of generally parallel strands, and to gradually change the shape of the bundle so that the bundle assumes the shape of the mouth, without loss of the orientation of the fibres.

It is observed that an actual flow channels assembly 50 may even have smoother transitions between sections of the flow channels as illustrated in this application.

In embodiments, the flow channels assembly 50 is made using an additive manufacturing technology, e.g. as one rigid and monolithic flow channels assembly body, e.g. 3D printed of plastic material. The body could also be composed of body parts, e.g. each being individually made by additive manufacturing technology and then interconnected.

The FIGS. 1-10 illustrate that, downstream of the respective inlet opening, each flow channel 53, 54, 55 comprises a converging section 56, 57, 58 in which the cross-sectional area of the flow channel gradually reduces, thereby, in operation, gradually compressing the strands into the coherent bundle. These sections 56, 57, 58 are preferably, as illustrated, located directly adjoining the respective inlet opening, but could also be spaced more downstream.

The FIGS. 1-10 illustrate that, the flow channels 53, 54, 55 are each devoid of an internal divider so that, in operation, one coherent bundle is discharged from one discharge mouth opening 61, 62, 63.

The FIGS. 1-10 illustrate that, the flow channel inlet openings all have substantially the same cross-sectional surface, the discharge mouths all have substantially the same cross-section surface, and that the flow channels 53, 54, 55 are all configured to provide substantially the same flow resistance to the bundle passing there through from the flow channel inlet opening to the discharge mouth 61, 62, 63.

As the bundle is confined within the flow channel and is gradually shaped into the cross-sectional shape of the discharge mouth whilst maintaining the generally parallel orientation of the strands in the bundle a portion of the bundle is received in a mould cavity 115. Herein the fibre orientation of the product will be the so-called vertical orientation as discussed herein.

In embodiments, the flow channels assembly 50 is temperature controllable by an associated heat exchange assembly of the system, e.g. a heater assembly, e.g. the flow channels assembly being provided with one or more ducts through which a heat exchange liquid is circulated.

In embodiments, the chamber 30 is temperature controllable by an associated heat exchange assembly of the system, e.g. a heater assembly, e.g. the chamber being provided with one or more ducts through which a heat exchange liquid is circulated.

It is illustrated in FIGS. 1-10 that the system 20 comprises a pressure sensor assembly 160 that is linked to the controller 170 and that is configured to sense the pressure of the foodstuff mass in at least one flow channel of the flow channels assembly 50. The sensor 160 can thereby act in a feedback control loop for controlling the pressure of the foodstuff that is fed into the chamber 30 by means of the pump.

The FIGS. 1-10 also illustrate that the system 20, including any grinder drive, and preferably including the shoe member 140 when present, is arranged on a guide structure 180 of the production device 100, so as to be movable as a unit relative to the drum 110. For example, as here, the guide structure 180 comprises one or more guide rails 181 of the frame 105 of the device 100, wherein the unit is movable along these one or more guide rails.

As preferred, as shown here, the guide structure 180 provides a rectilinear guide for the unit of system 20, including any grinder drive, and preferably including the shoe member 140 when present. This allows, for example, to move the unit away from the drum 110 so as to allow for enhanced replacement of the drum 110 by another drum.

The FIGS. 1-10 also illustrate that the unit, as preferred, is composed of stacked subunits that are arranged on a common rectilinear guide structure 180 and are independently movable over the guide structure 180. Herein the subunits are releasably interconnected in series. This allows, as illustrated, to disconnect neighbouring subunits and arrange them further apart so as to gain access.

For example, as shown, a first housing part of the chamber 30, e.g. provided with inlet 31, together with the transmission 92, grinder motor 91, and a portion of the shaft 93, forms one subunit 185. A second housing part of the chamber 30, preferably with the perforated plate 40, and with the grinder set 70 if present, as well as with the flow channels assembly 50 forms a second subunit 186.

For example, by moving the subunit 185 away from the second subunit 186 access can be gained to the inside of the chamber 30, e.g. in view of cleaning the chamber 30 and/or servicing, exchanging, any grinder set 75 therein.

The invention will now be discussed with reference to another example of an installation 201 according to the invention for the production of three-dimensional products from a mass of pumpable fibrous foodstuff material. For example, the foodstuff material is ground meat. The ground meat can be red meat, white meat (e.g. chicken meat), or fish meat.

As will be appreciated by the skilled person, instead of a mould drum as in the preceding example, the products are formed in a turret-type production device 300 having a revolving mould disc 310 that revolves in a horizontal plane about a vertical rotation axis 312.

In the mould disc 310, at different angular positions relative to the axis 312, mould cavity inserts 314 are releasably mounted. Each mould cavity insert includes multiple mould cavities 315, here having a fill opening at the bottom side of the disc 310 so as to be filled from below with foodstuff.

In the illustrated example, each mould cavity insert 314 has four cavities 315 in a rectangular grid, to form four food products simultaneously in one insert 314. Other 2D grid arrangements of a group of mould cavities 315 are also envisaged.

A mould disc drive 330 is configured to rotate or revolve the mould disc 310 about the vertical axis 312, preferably in an indexed or intermittent manner, wherein the disc 310 is at a standstill when the insert with cavities 315 is at a fill position. As shown, it is envisaged that the group of cavities 315 is then filled from below. The drive 330 then moves the disc so that the next insert with cavities 315 reaches the fill position.

At a release position R, the formed food products are ejected from the cavities 315 of the insert 314. This is done here by a pressurized air food product ejection system 400. At the release position a source 401 of pressurized air connects to an air channel 402 in a cap 316 over the insert 314. As the insert 314 is made, as preferred, porous, e.g. of porous metal or plastic, the air passing through the permeable insert and assist and/or effects the release of the formed products 425.

The formed products 425, as a group, here a group of four products, are received on belt 450 or other conveyor.

It will now be described how the cavities 315 of an insert 314 are filled.

Generally the installation 201 comprises:
a foodstuff mass feed and pressurization assembly 210, with hopper 211 and pump 212 for example,
a system 220 for creating multiple coherent bundles of strands of fibrous foodstuff material from a mass of pumpable fibrous foodstuff material, and for providing these bundles to a production device 300 of the installation that is configured to produce three dimensional products 425, each product 425 out of a portion of a bundle discharged from a discharge mouth of a flow channels assembly 250 of the system, wherein the assembly 310 is configured to feed mass of pumpable fibrous foodstuff material into a chamber 230 of the system 220 via the inlet 231 thereof,
a production device 300 that is arranged at the discharge mouths 261, 262, 263, 264 of the flow channels assembly 250 of the system, which production device is configured to produce three dimensional products, each product out of a portion of one bundle that is discharged from a discharge mouth of the flow channels assembly.

For example, the pump 212 is a rotary vane pump, e.g. as marketed by Risco or Handtmann for use in the food industry, e.g. for pumping ground meat.

An embodiment of the system 220 will be described in detail further below. In general, the system 220 comprises:
the chamber 230 having the inlet 231 connected to the foodstuff mass feed and pressurization assembly, here to the outlet of pump 212, and having an outlet side 232,
a perforated plate 240 that is stationary arranged at the outlet side 232 of the chamber 230, which perforated plate has a multitude of perforations therein between an inlet face of the perforated plate that is directed towards the chamber and an opposed outlet face of the perforated plate 240,
a flow channels assembly 250 that connects to the outlet side 232 of the chamber 230,
which flow channels assembly comprises multiple flow channels 253, 254, 255, 256, each flow channel having a flow channel inlet opening 253a, 254a, 255a, 256a a flow channel discharge mouth 261, 262, 263, 264, and a flow channel length.

As shown the discharge mouths 261, 262, 263, 264 are arranged in a 2D-grid, here a rectangular grid.

As shown the discharge mouths 261, 262, 263, 264 are located in a horizontal plane, with the mould disc 310 moving over these mouths so that the cavities 315 in an insert 314 can be aligned each with a corresponding one of the group of mouths.

As shown the flow channel inlet openings 253a, 254a, 255a, 256a are stationary arranged adjoining the outlet face of the perforated plate 240, so that, in operation, each flow channel 253, 254, 255, 256 receives therein strands of fibrous foodstuff material emerging at the outlet face of the perforated plate 240 from a subset of the multitude of perforations in the perforated plate. These flow channels 253, 254, 255, 256 are configured so that, in operation, the strands that are introduced into a flow channel merge into a coherent bundle 501, 502, 503, 504, in which the strands 490 are arranged against one another in a generally parallel orientation.

Figure 14:
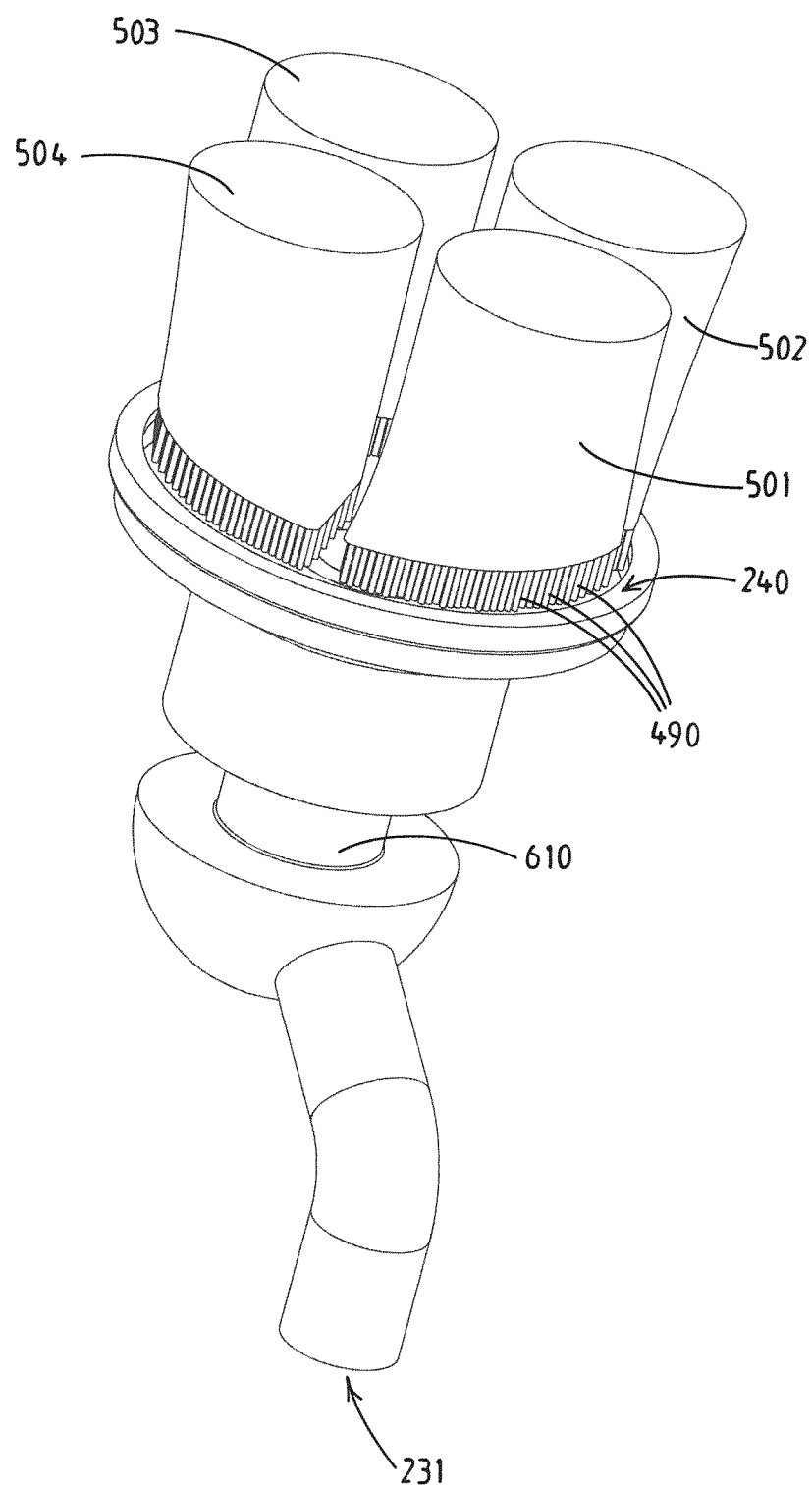
FIG. 14 illustrates the foodstuff material within the system of FIG. 12, FIGS. 15a-d illustrate an embodiment of a flow channels assembly.

It is noted that FIG. 14 schematically depicts the foodstuff mass as it passes through the system 220. The position of perforated plate 240 is indicated. It can be seen that the strands 490 emerge from the perforated plate 240 and immediately subsets are made that are then merged by their respective flow channel into one of the multiple bundles 501, 502, 503, 504. In operation, each bundle is confined within its respective flow channel and passes through the flow channel to the respective discharge mouth where the bundle is discharged, whilst maintaining the generally parallel orientation of the strands in the bundle. A portion of the bundle is then received in a mould cavity 315 via the fill opening thereof, which, preferably, corresponds in shape and dimensions to the shape and dimensions of the mouth in order to maintain the fibre orientation during this transfer. This arrangement allows to maintain the fibre orientation in the formed product. This allows, for example, for the production of enhanced quality ground meat products, e.g. burgers or steaks, having a so-called vertical fibre orientation between the upper and lower main faces thereof.

The FIGS. 11-14 illustrate that, the multitude of perforations in the perforated plate 240, having a blind center, are distributed within an annular area of the perforated plate. The inlet opening of each of the flow channels is configured with a cross-sectional surface that corresponds to the annular sector of the area in which the multitude of perforations are distributed. This shape differs significantly from the shape of each of the discharge mouths 261, 262, 263, 264, e.g. said mouths being circular, square, oblong, etc. The flow channels are generally designed to receive the strands emerging from the perforated plate 240, bundle them into multiple coherent bundles of generally parallel strands, and to gradually change the shape of each of the bundles so that the bundle assumes the shape of the mouth, without loss of the orientation of the fibres.

The FIGS. 11-14 illustrate that a grinder set 270 here having only mobile grinder member 275 is arranged in the chamber 230. The mobile grinder member 275 is drivable by a grinder drive 290. This mobile grinder member 275 is arranged adjacent the inlet face of the perforated plate 240 and cooperates with the perforated plate allowing to grind the fibrous foodstuff mass. The mobile grinder member 275 is a rotary grinder member that is rotatable about an axis perpendicular to the inlet face of the perforated plate 240. As shown the rotary grinder member 275 has a central hub that is joined to rotary grinder drive shaft 293 driven by grinder motor 291.

The FIGS. 11-14 illustrate that a flow restrictor 600 is arranged within the chamber 230, upstream from the grinder set 270, here the one mobile grinder member 275. This restrictor enhances uniformity of the flow of foodstuff mass towards the grinder set. It is shown that the flow restrictor defines a locally reduced annular cross-section 610 (see also FIG. 14) about the rotary drive shaft 293 for the foodstuff mass passing from the inlet of the chamber to the grinder set. In more detail, it is shown here that the flow restrictor comprises an annular flange 601 that is arranged within the chamber 230 and has a central opening therein larger than the diameter of the rotary drive shaft 293 so as to define a locally reduced annular cross-section for the foodstuff mass between the drive shaft and the annular flange.

Figure 12:
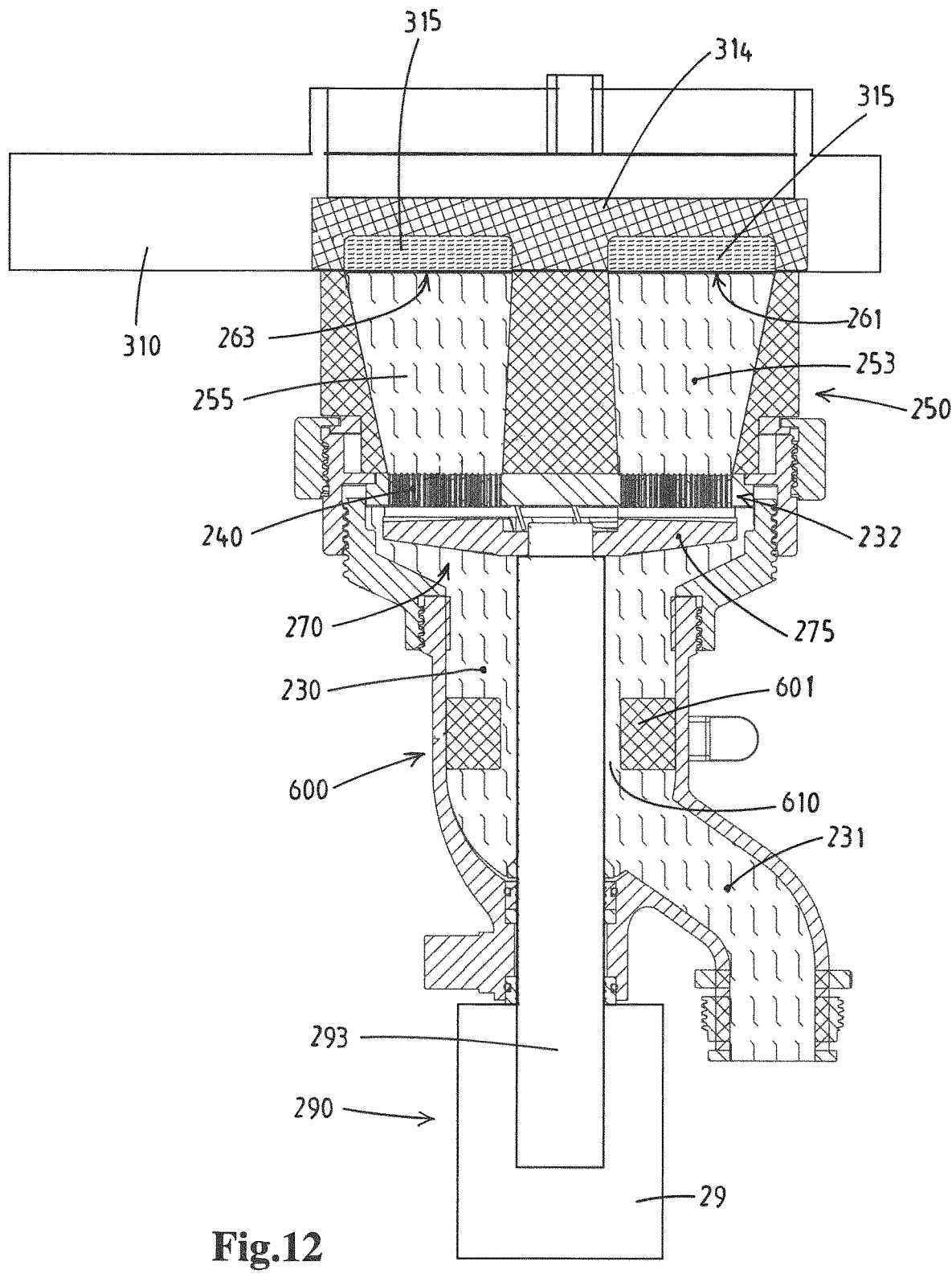
FIG. 12 shows in cross-section the system for creating multiple coherent bundles of the installation in FIG. 11 and a part of the mould disc.
Figure 13:
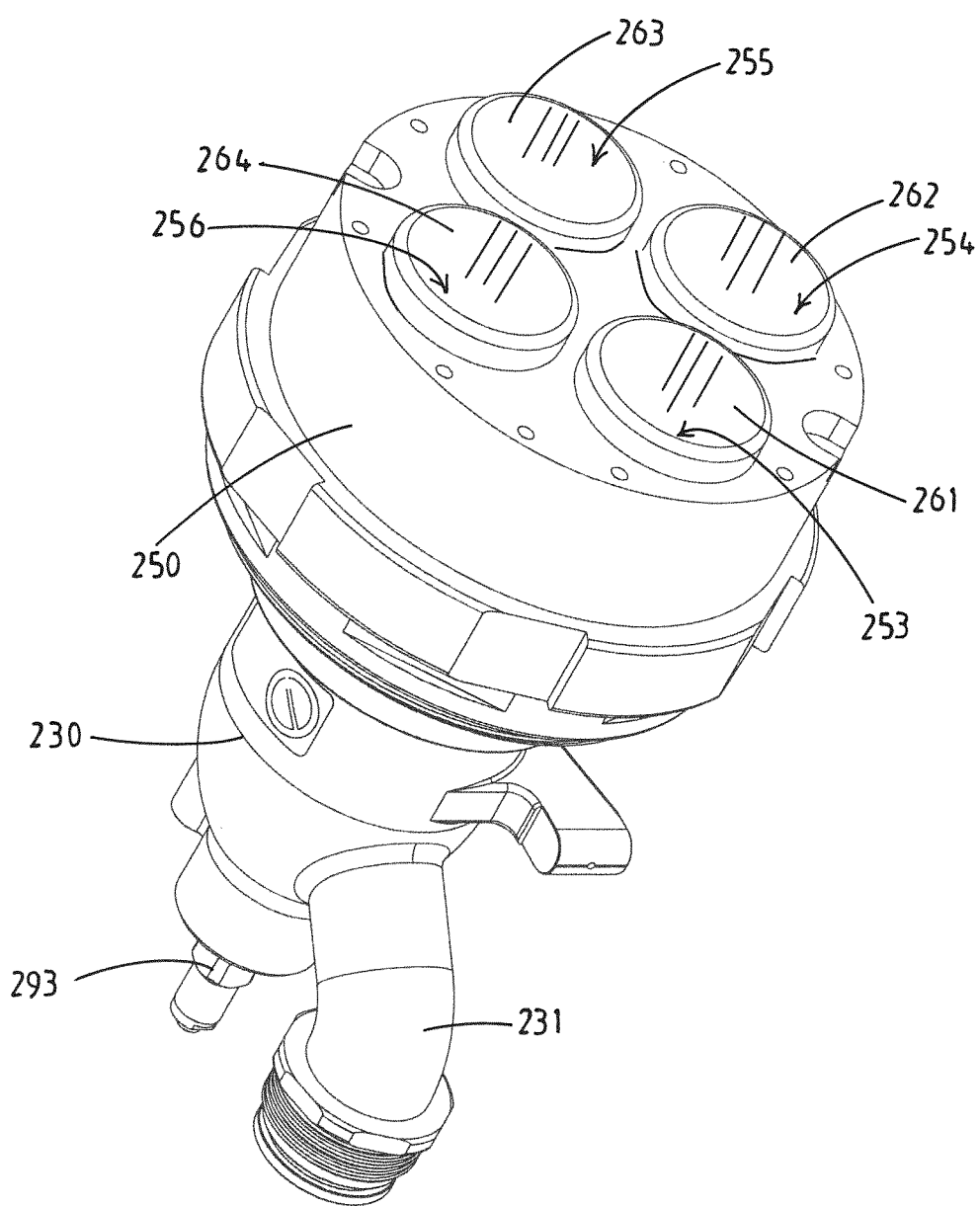
FIG. 13 shows in a perspective view the system of FIG. 12.

FIG. 12 shows that, in embodiments, the flow channels assembly 250 is made using an additive manufacturing technology, e.g. as one rigid and monolithic flow channels assembly body, e.g. 3D printed of plastic material. The body could also be composed of body parts, e.g. each being individually made by additive manufacturing technology and then interconnected.

The body of the assembly 250 is releasably mounted to the chamber housing of chamber 230, so as to allow for an exchange of one assembly 250 for another assembly having a different design of the flow channels therein, e.g. when also exchanging the mould disc 310 or the inserts 314 for the production of other food products 245.

Figure 15:
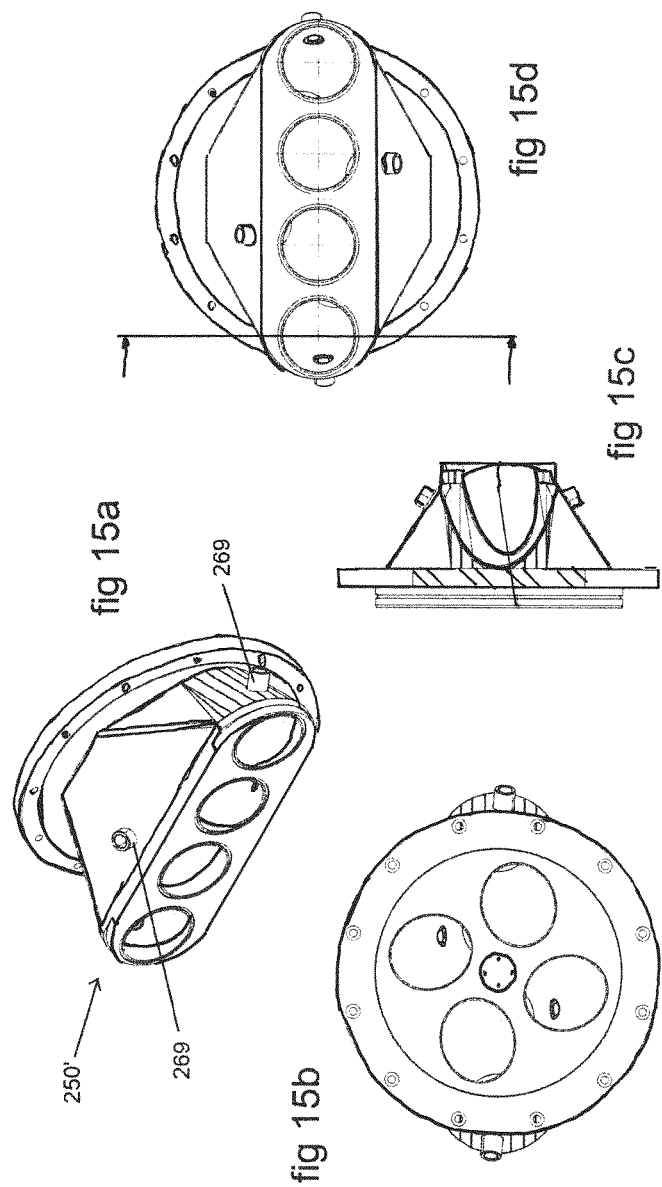

The FIGS. 15a-15d illustrate a flow channels assembly 250' having flow channels with an elliptical inlet opening and circular discharge mouths in a side-by-side arrangement in a common plane, here four flow channels. The FIG. 15c is a cross-section over the line indicated in FIG. 15d. The flow channels are generally designed to receive the strands emerging from the perforated plate, e.g. plate 240, bundle them into multiple coherent bundles of generally parallel strands, and to gradually change the shape of each of the bundles so that the bundle assumes the shape of the mouth, without loss of the orientation of the fibres.

The FIGS. 15a-15d illustrate that the flow channels assembly 250' can be construed primarily from sheet and tubular materials, e.g. steel plate and steel tubing, e.g. as a welded structure, which may be beneficial in view of costs.

The FIGS. 15a-15d illustrate that the flow channels assembly 250' can be provided with multiple pressure sensors, e.g. one for each flow channel, e.g. each mountable in a corresponding fitting 269. For example, this allows to monitor the operation of the system, e.g. allows to detect local clogging of the perforated plate interfering with the flow of strands into a channel, e.g. when a grinder is provided.

Figure 16:
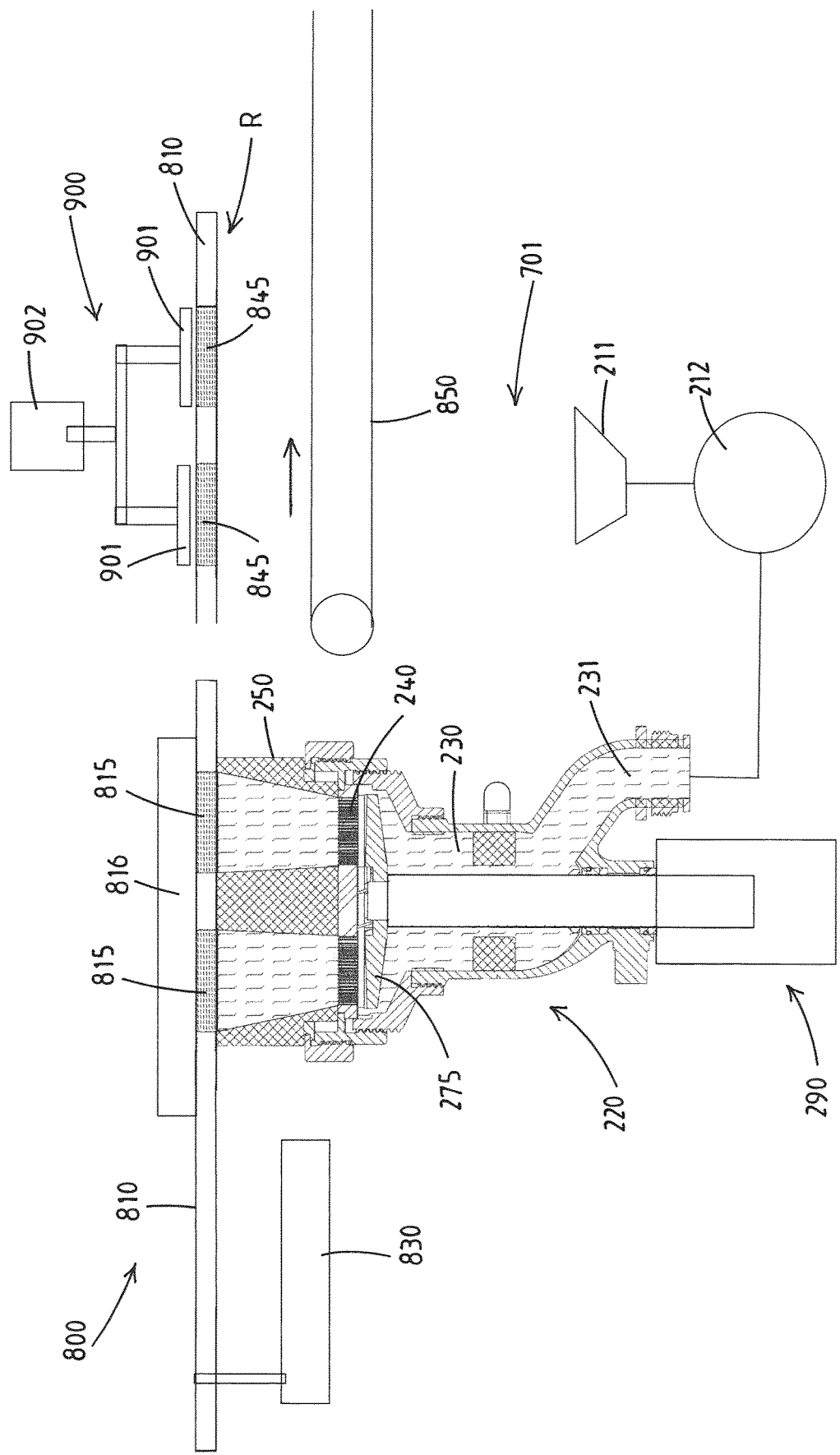
FIG. 16 illustrates yet another example of an installation according to the invention.
Figure 17:
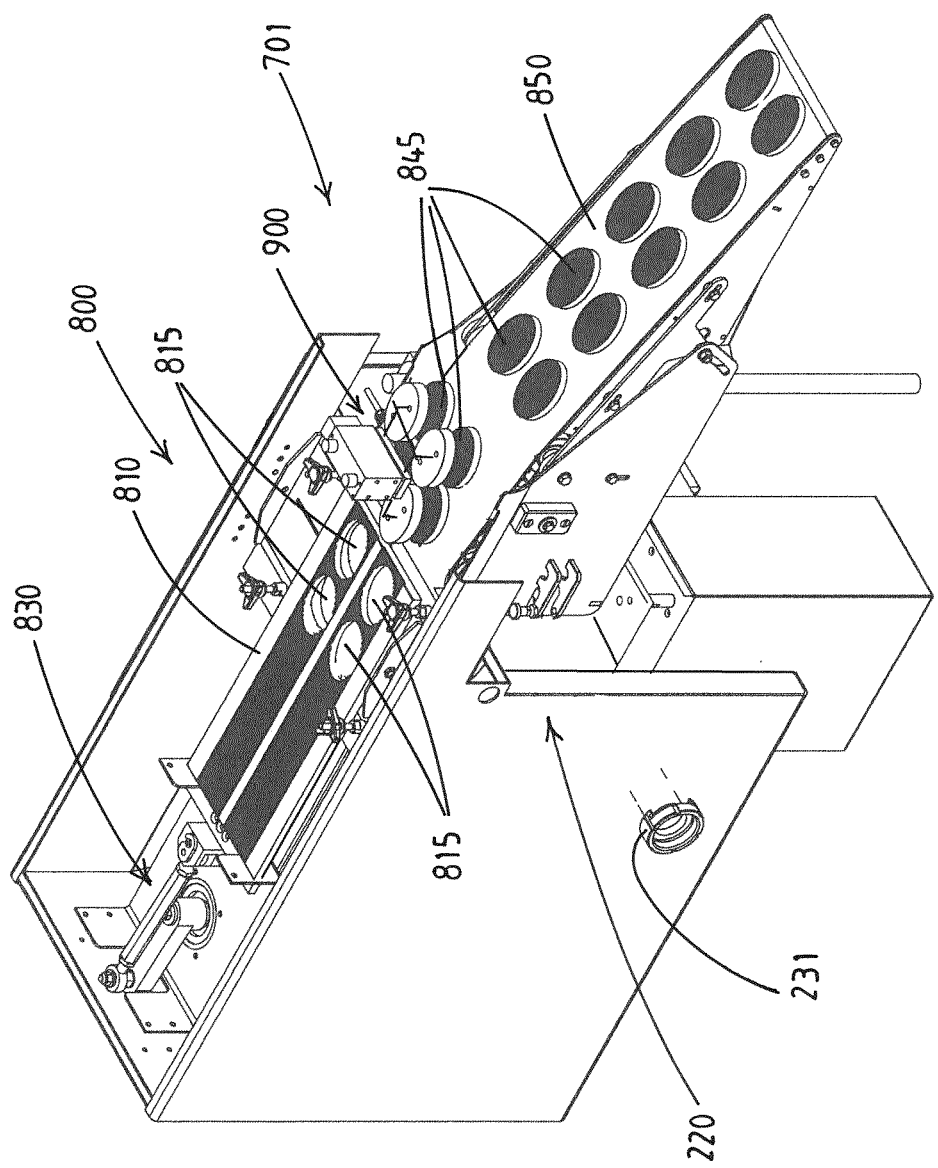
FIG. 17 illustrates an embodiment of the production device of the example of FIG. 16.

With reference to FIGS. 16 and 17, yet another example of an installation 701 according to the invention for the production of three-dimensional products from a mass of pumpable fibrous foodstuff material will be discussed. For example, the foodstuff material is ground meat. The ground meat can be red meat, white meat (e.g. chicken meat), or fish meat.

As will be appreciated by the skilled person, instead of a revolving mould disc 310 as in the preceding example, the products are formed in a reciprocating plate-former production device 800 having a reciprocating mould plate 810 that moves in a horizontal plane between a fill position and a release position by a corresponding reciprocating plate drive 830.

In the plate, 810 mould cavities 815 are present as holes through the thickness of the plate 810 from the bottom to the top of the plate 810.

Filling of the mould cavities 815 is done from below, as is preferred, with the top of the cavities 815 being closed by a stationary top plate 816 of the device 800. In FIG. 16 the top plate has been removed for clarity.

FIG. 16 illustrates that multiple cavities, here a grid of four cavities 815 yet another other number could also be possible, is filled by means of the system 220 described herein with reference to FIGS. 11-14.

Pump 212, e.g. a positive displacement pump, is supplied with foodstuff mass from hopper 211. The pump 212 feeds the mass at a pressure to the system 220, where the mass is ground by grinder set 270 before passing through the perforated plate 240. At the outlet face of the plate 240 the flow channels assembly 250 receives the strands, each subset of strand being converted into a respective bundle as described herein. Each bundle is then discharged via a respective mouth into one of the cavities 815 of the mould plate 810 at the fill position. As preferred, the shape and dimension of the fill opening of the cavity 815 corresponds to the shape and dimension of the mouth.

Once the cavities 815 are each filled with a portion of the bundle, the mould plate 810 is moved by the respective drive 830 to the release position R. There a knockout mechanism 900 ejects the formed products from the cavities 815. For example, knockout cups 901 are moved up and down by actuator 902. The products are then received on a belt 850, e.g. as shown in FIG. 17.

Figure 18:
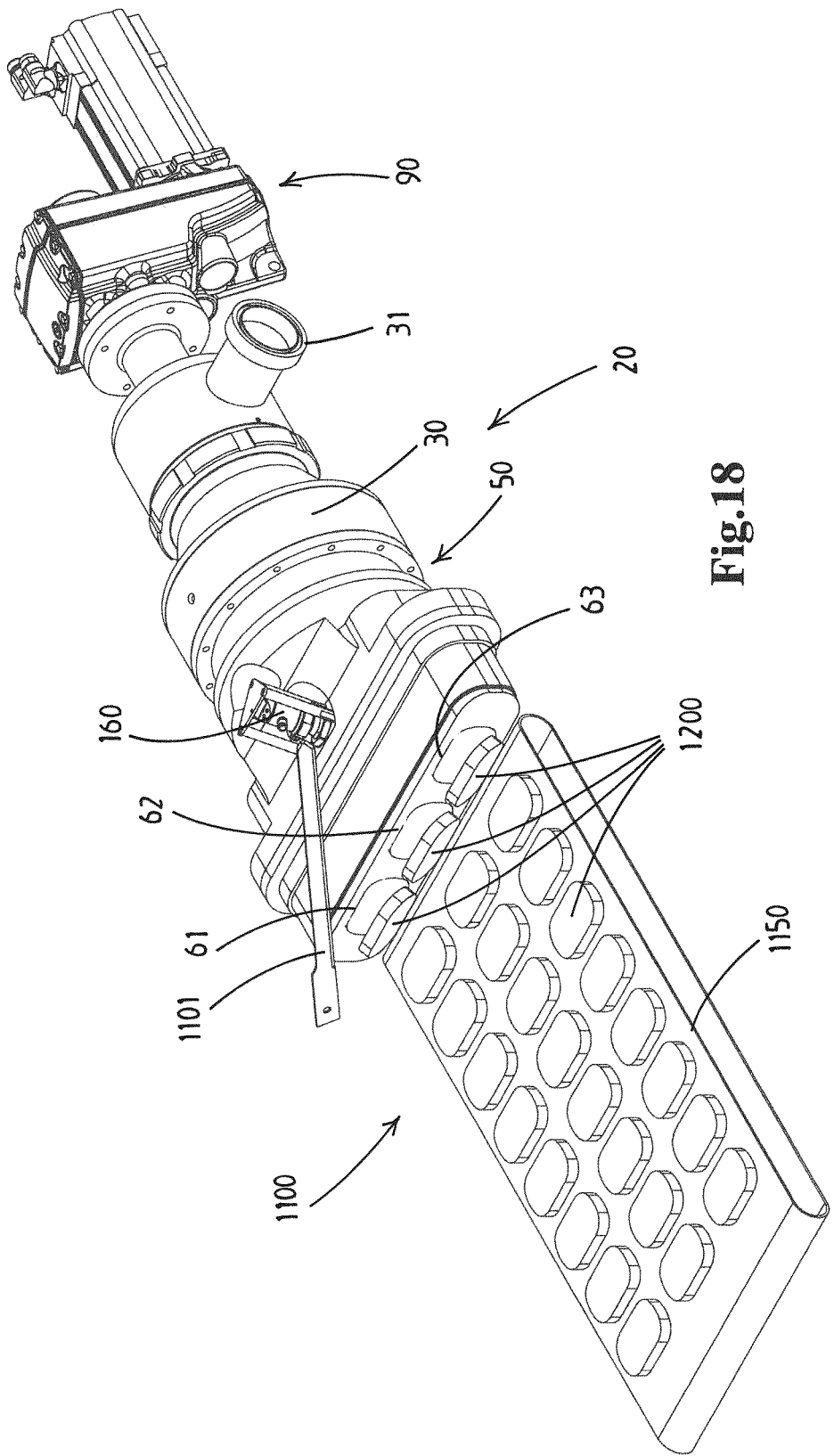
FIG. 18 illustrates yet another example of an installation according to the invention.
Figure 19:
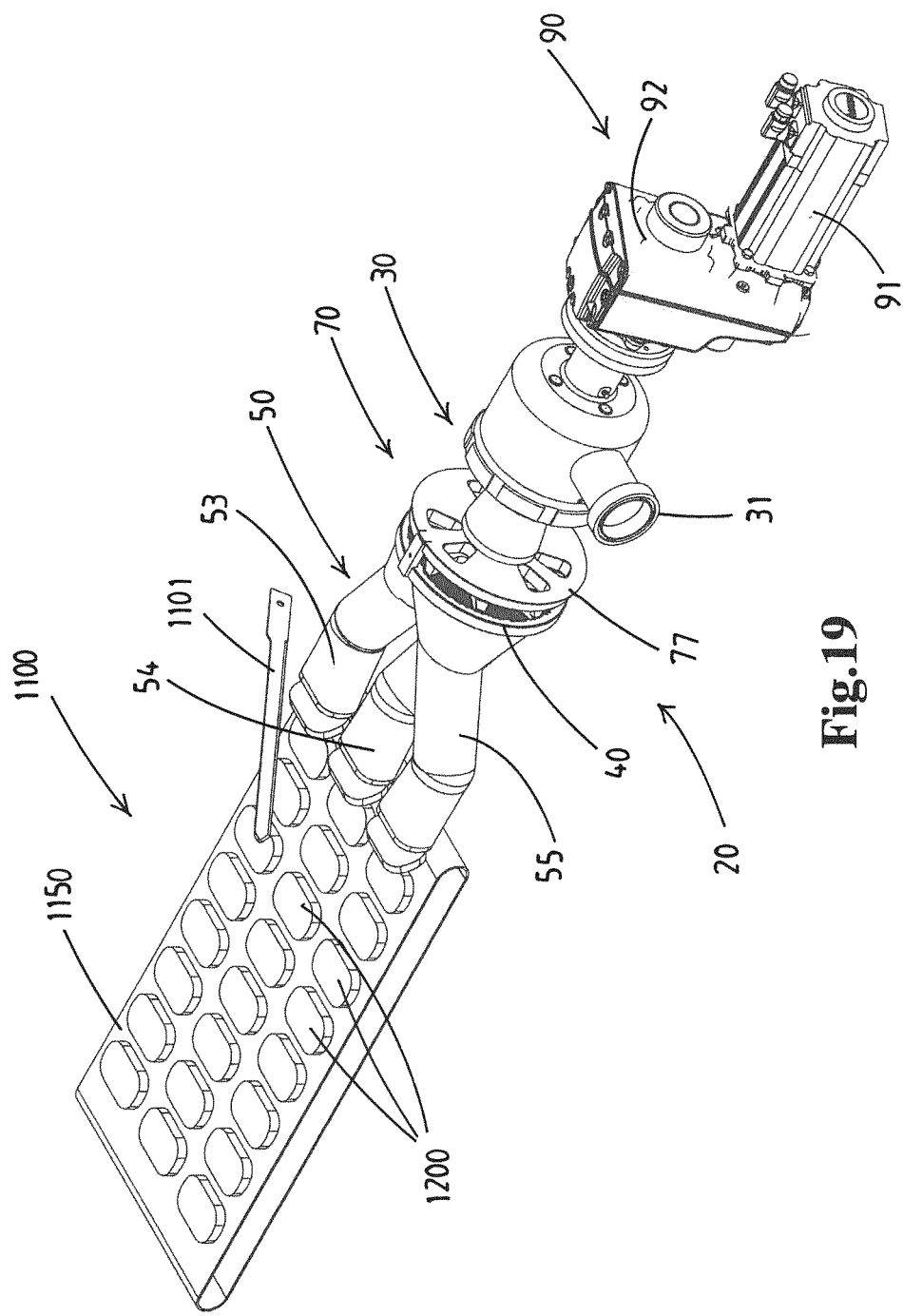
FIG. 19 shows the installation of FIG. 18 from another angle with a part of the chamber housing left out for clarity.
Figure 20:
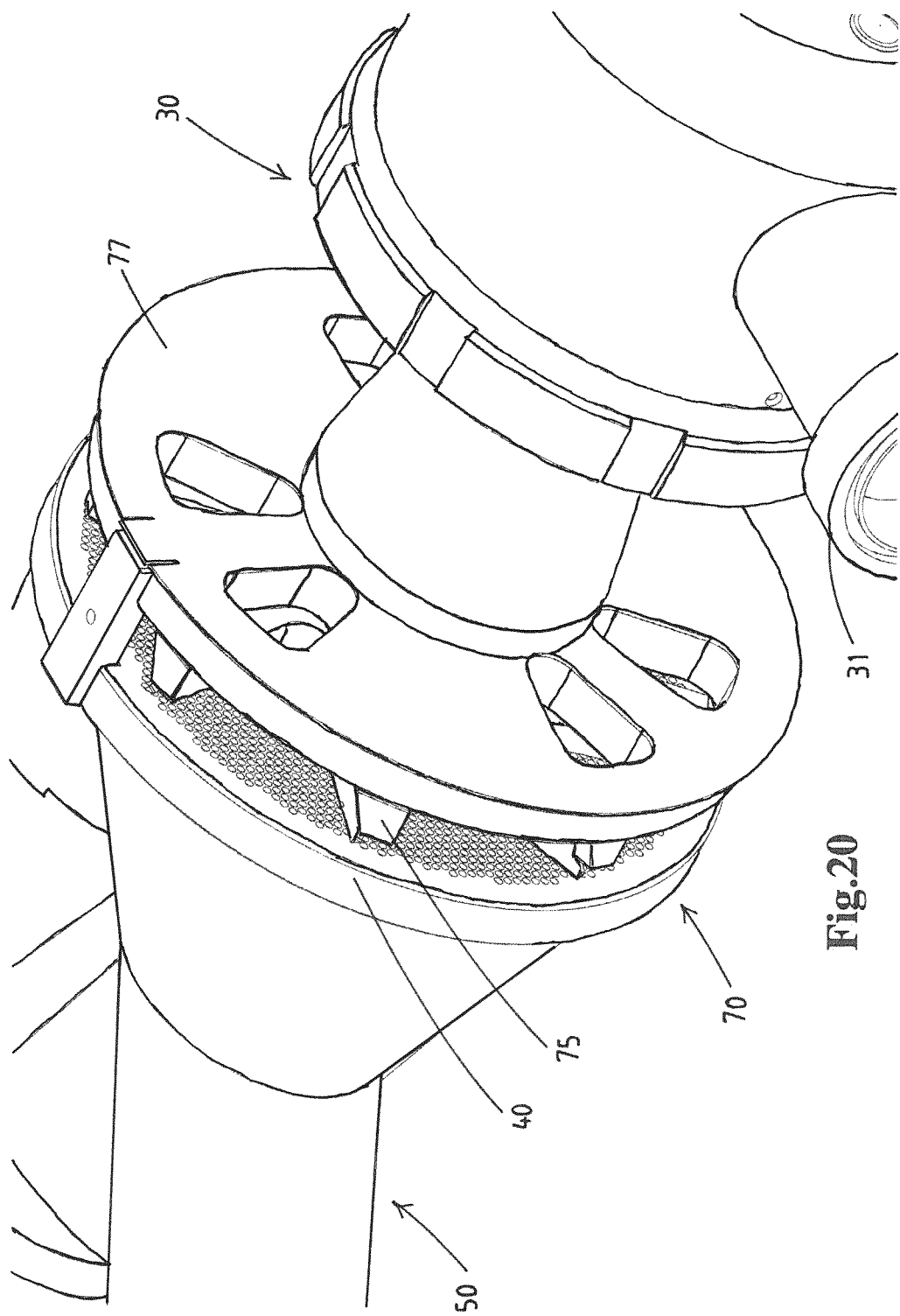
FIG. 20 shows a part of FIG. 19 on a larger scale.

With reference to FIGS. 18-20, the invention will be further discussed in the context of an installation 1001 comprising the system 20 as discussed in relation to FIGS. 1-10, in combination with a production device 1100.

The production device 1100 is provided with a bundle severing assembly 1101, here a movable knife member, that is configured and operated to sever the bundles that are discharged from the discharge mouths 61, 62, 63 in order to sever individualized portions 1200 from the bundles.

The production device comprises a belt conveyor 1150 having a belt, and the discharge mouths are arranged above the belt conveyor. The bundle severing assembly is arranged in proximity of the discharge mouths 61, 62, 63 so that the individualized portions are received on the belt 1150.

In FIG. 19, the flow channels are visible as well as the perforated plate 40 and the grinder set 70 with mobile grinder member 75 and stationary grinder member. FIG. 20 shows the multitude of perforations in the plate 40.

As is known in the art, discharge of the formed products could also be done in a manner that products are stacked or shingled and/or be done so that formed products are directly received in packaging containers, e.g. for distribution to consumers.

Formed products could also be subjected to further treatments, e.g. one or more of coating, frying, cooking, freezing, etc.

Figure 21:
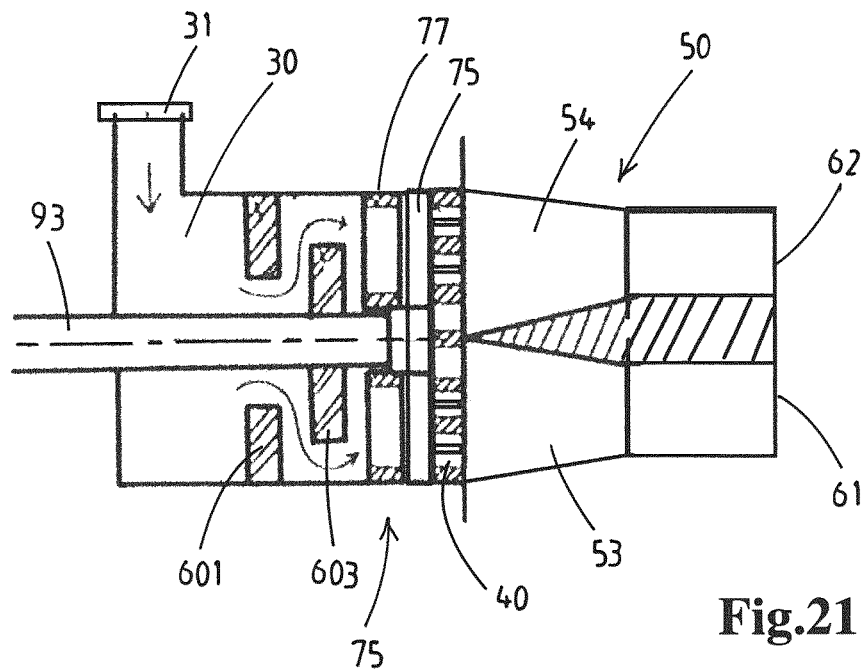
FIG. 21 illustrates an alternative design of the flow restriction.

FIG. 21 illustrates an alternative design of the flow restriction 600. As indicated by the arrows representing the flow of mass of foodstuff material through the chamber 30 towards the grinder set 75, a labyrinth is formed to enhance uniformity.

The annular flange 601 is now supplemented by a flow restrictor disc 603 that is mounted on the rotary drive shaft 93 axially offset from the flange 601, here between the flange 601 and the grinder set 75, so as to define a locally reduced annular cross-section for the foodstuff mass between the disc 603 and the chamber wall of chamber 30. As illustrated, the provision of a flow restrictor, e.g. as shown in FIG. 20 or otherwise disclosed herein, is advantageous in particular when the inlet 31 is at an angle relative to the main axis of the chamber 30 towards the grinder set 75.

FIG. 21 illustrates schematically an embodiment of a flow channels assembly 50 connecting to the chamber 30 with flow channels 53, 54 directly adjoining with their inlet openings the outlet face of the perforated plate 40.

Figure 22:
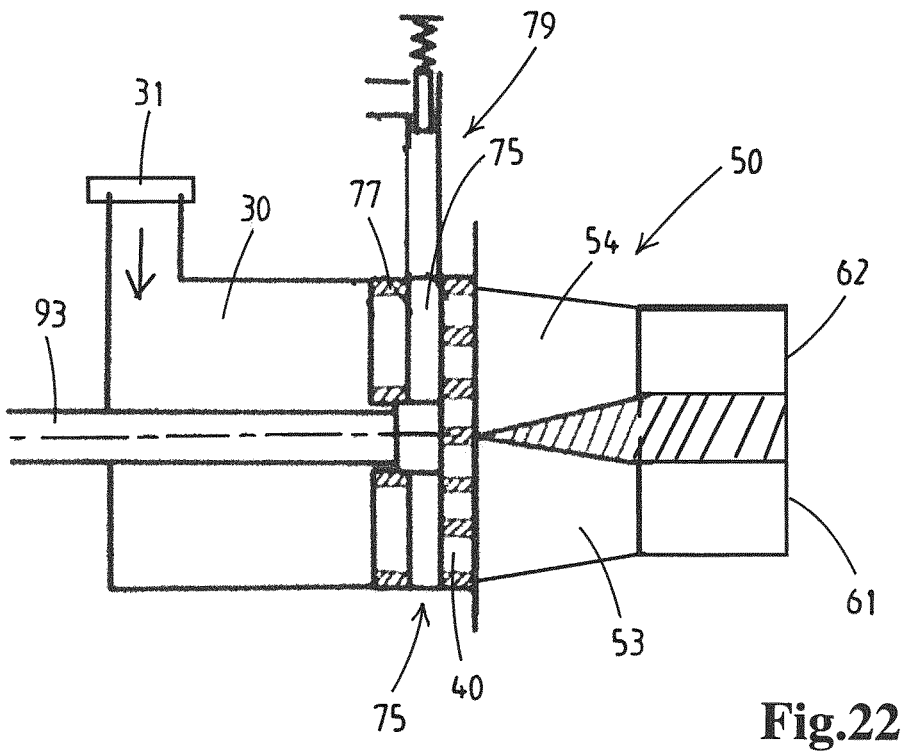
FIG. 22 illustrates an alternative design of the grinder set.

FIG. 22 illustrates the additional measure of providing a bone removal device 79 to the grinder set 75, so as to allow for removal of any bone fragments or similar from the (meat) mass. Many different designs of such devices are known in the art and can be integrated in the present invention.

Figure 23:
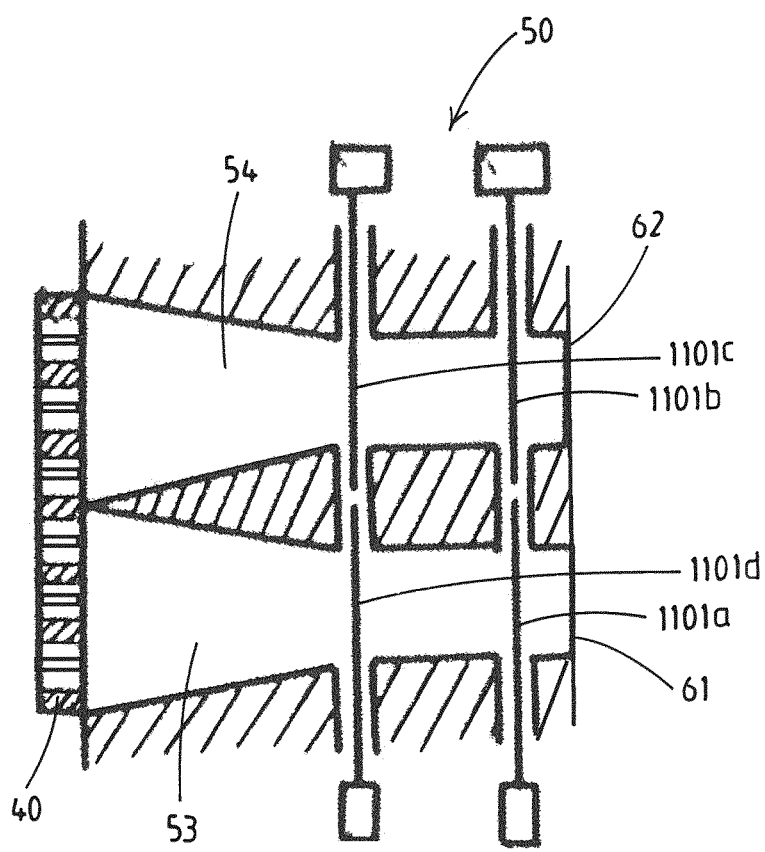
FIG. 23 illustrates an alternative design of the severing assembly.

FIG. 23 illustrates an alternative design of the production device, wherein the bundle severing assembly is integrated structurally with the flow channels assembly 50. Herein, at least one bundle severing member 1101a,b,c,d is located upstream of the one or more discharge mouths 61, 62, 63, so that the bundle is severed before being discharged from the mouth. It is illustrated, as an embodiment, that one could also provide two severing members at axially spaced locations along the length of the flow channel, so as to make cuts through each bundle before the bundle is discharged. One advantage of severing the bundles whilst still confined with the flow channel, is that the bundle is less prone to undue deformation due to the severing action. For example, the one or more severing members integrated with the flow channels assembly are arranged along an outlet section of the flow channel where there is no further change of shape and cross-sectional dimensions.

The invention claimed is:

1. A method for the production of three-dimensional products from a mass of pumpable fibrous foodstuff material, for example from ground meat,
    wherein the mass of pumpable fibrous foodstuff material is fed by a foodstuff mass feed and pressurization assembly into a chamber via an inlet thereof,
    wherein a perforated plate is stationary arranged at an outlet side of the chamber, which perforated plate has a multitude of perforations therein between an inlet face of the perforated plate directed towards said chamber and an opposed outlet face of the perforated plate,
    wherein a flow channels assembly connects to the outlet side of the chamber,
    which flow channels assembly comprises multiple flow channels, each flow channel having a flow channel inlet opening, a flow channel discharge mouth, and a flow channel length,
    wherein the flow channel inlet openings are stationary arranged adjoining the outlet face of the perforated plate, so that each flow channel receives therein strands of fibrous foodstuff material emerging at the outlet face of the perforated plate from a subset of the multitude of perforations in the perforated plate,
    wherein the strands that are introduced into a flow channel merge into a coherent bundle, in which the strands are arranged against one another in a generally parallel orientation,
    wherein said bundle is confined within the flow channel and passes through the flow channel to the discharge mouth where the bundle is discharged, whilst maintaining the generally parallel orientation of the strands in the bundle,
    wherein a production device is arranged at the discharge mouths of the flow channels assembly, which production device is configured and operated to produce three-dimensional products, each product out of a portion of a bundle that is discharged from one of the discharge mouths.

2. The method according to claim 1, wherein, downstream of the respective inlet opening, each flow channel comprises a converging section in which the cross-sectional area of the flow channel gradually reduces, thereby gradually compressing the strands into the coherent bundle as the bundle passes through the converging section.

3. The method according to claim 1, wherein the flow channels are each devoid of an internal divider so that one coherent bundle is discharged from each one of the discharge mouths.

4. The method according to claim 1, wherein the flow channel inlet openings all have substantially the same cross-sectional surface,
    wherein the discharge mouths all have substantially the same cross-section surface, and
    wherein the flow channels are configured to all provide substantially the same flow resistance to the bundle passing there through from the flow channel inlet opening to the discharge mouth.

5. The method according to claim 1, wherein, for each flow channel, the flow channel discharge mouth has a cross-sectional shape that differs in cross-sectional shape from the flow channel inlet opening,
    wherein the flow channel comprises a shaping section having a gradually changing cross-sectional shape,
    wherein the bundle is confined within the flow channel and is gradually shaped into said cross-sectional shape of the discharge mouth whilst maintaining the generally parallel orientation of the strands in the bundle.

6. The method according to claim 1, wherein the multitude of perforations in the perforated plate are distributed within a circular or annular area of the perforated plate, and
    wherein, for example, the inlet opening of each of the flow channels is configured with a cross-sectional surface that corresponds to a circular sector or an annular sector of the area in which the multitude of perforations are distributed, and/or
    wherein, for example, the discharge mouths are arranged relative to one another:
    side-by-side, or
    in a two-dimensional grid.

7. The method according to claim 1, wherein a grinder set comprising one or more grinder members is arranged in the chamber, at least one of said grinder members being a mobile grinder member that is driven by a grinder drive,
- wherein the fibrous foodstuff mass is ground by the one or more mobile grinder members.

8. The method according to claim 7, wherein at least one mobile grinder member is arranged adjacent the inlet face of the perforated plate and cooperates with the perforated plate to grind the fibrous foodstuff mass,
- wherein, for example, the at least one mobile grinder member is a rotary grinder member that is rotated about an axis perpendicular to the inlet face of the perforated plate, wherein the rotary grinder member has a central hub joined to a rotary drive shaft.

9. The method according to claim 7, wherein a flow restrictor is arranged within the chamber, upstream from the grinder set, said flow restrictor enhancing uniformity of the flow of foodstuff mass towards the grinder set,
- wherein, for example, a rotary grinder member is mounted on a rotary drive shaft that extends into said chamber, perpendicular to the inlet face of the perforated plate, and
- wherein the flow restrictor defines a locally reduced annular cross-section about the rotary drive shaft for the foodstuff mass passing from the inlet of the chamber to the grinder set.

10. The method according to claim 1, wherein the production device comprises a mobile mould member that is provided with multiple mould cavities,
- wherein the mobile mould member is moved along a path, and
- wherein the discharge mouths are arranged relative to said path so that when said multiple mould cavities are arranged at a fill position thereof, possibly being temporarily stationary or slowed down at said fill position, each of the discharge mouths is in communication with a respective mould cavity and a portion of the bundle of foodstuff mass is discharged from said discharge mouth into the mould cavity to form the product,
- wherein the mobile mould member is then moved so that the filled mould cavities are in a product release position thereof, where the moulded three-dimensional food products are released from the mould cavities.

11. The method according to claim 1, wherein the production device comprises a mould drum having an outer circumferential drum surface and a longitudinal drum rotation axis, the mould drum being rotatably supported by a frame of the production device to revolve about the drum rotation axis,
- wherein said outer circumferential drum surface comprises multiple circumferential arrays of mould cavities,
- wherein the circumferential arrays are located at distinct positions in the direction of the longitudinal drum rotation axis,
- wherein, in each circumferential array, multiple mould cavities are present at spaced locations in circumferential direction of the drum surface, each mould cavity having a fill opening for introduction of foodstuff mass into the mould cavity,
- wherein the discharge mouths are each aligned with a corresponding one of said circumferential arrays of mould cavities of the mould drum, so that a portion of the bundle of foodstuff mass is transferred from each discharge mouth into a mould cavity of the corresponding circumferential array of the revolving mould drum when the fill opening of a mould cavity is in communication with the discharge mouth opening at a fill position, possibly being temporarily stationary at said fill position, said foodstuff mass forming a food product in said mould cavity,
- wherein the formed food product is released from the mould cavity at a release position remote from the fill position.

12. The method according to claim 1, wherein the production device is provided with, or embodied as, a bundle severing assembly that is configured and operated to sever the bundles that are discharged from the discharge mouths in order to sever individualized portions from the bundles,
- wherein, for example, the production device comprises a belt conveyor having a belt,
- wherein the discharge mouths are arranged above the belt conveyor, and
- wherein the bundle severing assembly is arranged in proximity of the discharge mouths so that said individualized portions are received on the belt, or
- wherein, for example, the production device comprises a belt conveyor having a belt,
- wherein the discharge mouths are arranged above the belt conveyor so that the bundles are received on the belt, and
- wherein the severing assembly is arranged downstream of the discharge mouths and is configured and operated to sever the bundles that have been received on the belt so as to form said individualized portions.

13. A system for creating multiple coherent bundles of strands of fibrous foodstuff material from a mass of pumpable fibrous foodstuff material, for example from ground meat, and for providing said bundles to a production device that is configured to produce three dimensional products, each product out of a portion of a bundle discharged from a discharge mouth of the system,
- wherein the system comprises:
- a chamber having an inlet connectable to a foodstuff mass feed and pressurization assembly configured to feed mass of pumpable fibrous foodstuff material into the chamber via the inlet thereof,
- a perforated plate that is stationary arranged at an outlet side of the chamber, which perforated plate has a multitude of perforations therein between an inlet face of the perforated plate directed towards said chamber and an opposed outlet face of the perforated plate,
- a flow channels assembly that connects to the outlet side of the chamber,
- which flow channels assembly comprises multiple flow channels, each flow channel having a flow channel inlet opening, a flow channel discharge mouth, and a flow channel length,
- wherein the flow channel inlet openings are stationary arranged adjoining the outlet face of the perforated plate, so that, in operation, each flow channel receives therein strands of fibrous foodstuff material emerging at the outlet face of the perforated plate from a subset of the multitude of perforations in the perforated plate,
- wherein the flow channels are configured so that, in operation, the strands that are introduced into a flow channel merge into a coherent bundle, in which the strands are arranged against one another in a generally parallel orientation,
- wherein the flow channels are configured so that, in operation, said bundle is confined within the flow channel and passes through the flow channel to the discharge mouth where the bundle is discharged, whilst maintaining the generally parallel orientation of the strands in the bundle, wherein a production device is arrangeable at the discharge mouths of the flow channels assembly, which production device is configured to produce three-dimensional products, each product out of a portion of a bundle discharged from the discharge mouth.

14. The system according to claim 13, wherein, downstream of the respective inlet opening, each flow channel comprises a converging section in which the cross-sectional area of the flow channel gradually reduces, thereby, in operation, gradually compressing the strands into the coherent bundle.

15. Installation for the production of three-dimensional products from a mass of pumpable fibrous foodstuff material, for example from ground meat, wherein the installation comprises:

a foodstuff mass feed and pressurization assembly, a system according to claim 14, wherein the foodstuff mass feed and pressurization assembly are configured to feed mass of pumpable fibrous foodstuff material into the chamber of the system via the inlet thereof, a production device that is arranged at the discharge mouths of the flow channels assembly of the system, which production device is configured to produce three dimensional products, each product out of a portion of one bundle that is discharged from a discharge mouth of the flow channels assembly.

* * * * *